(12) United States Patent
Dusterhoft et al.

(10) Patent No.: US 8,333,241 B2
(45) Date of Patent: Dec. 18, 2012

(54) METHODS AND COMPOSITIONS FOR PACKING VOID SPACES AND STABILIZING FORMATIONS SURROUNDING A WELLBORE

(75) Inventors: Ronald G. Dusterhoft, Katy, TX (US); Michael W. Sanders, Duncan, OK (US); Philip D. Nguyen, Duncan, OK (US); Bhadra Desai, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 270 days.

(21) Appl. No.: 12/831,684

(22) Filed: Jul. 7, 2010

(65) Prior Publication Data
US 2010/0270023 A1 Oct. 28, 2010

Related U.S. Application Data

(63) Continuation-in-part of application No. 11/880,230, filed on Aug. 30, 2007, which is a continuation-in-part of application No. 11/351,931, filed on Feb. 10, 2006, now Pat. No. 7,819,192.

(51) Int. Cl.
*E21B 43/04* (2006.01)
*E21B 43/267* (2006.01)
*E21B 33/13* (2006.01)

(52) U.S. Cl. ............... 166/292; 166/278; 166/280.1; 166/295

(58) Field of Classification Search .................. None
See application file for complete search history.

(56) References Cited

U.S. PATENT DOCUMENTS

| | | | |
|---|---|---|---|
| 3,373,106 A | 3/1968 | Lister et al. | |
| 3,509,951 A | 5/1970 | Enochs | |
| 3,933,204 A | 1/1976 | Knapp | |
| 4,000,781 A | 1/1977 | Knapp | |
| 4,220,566 A | 9/1980 | Constien et al. | |
| 4,662,449 A | 5/1987 | Friedman | |
| 4,888,240 A | 12/1989 | Graham et al. | |
| 5,358,047 A * | 10/1994 | Himes et al. | 166/280.1 |
| 5,363,917 A | 11/1994 | Jennings et al. | |
| 5,697,443 A | 12/1997 | Brezinski et al. | |
| 5,875,844 A * | 3/1999 | Chatterji et al. | 166/293 |
| 6,257,335 B1 * | 7/2001 | Nguyen et al. | 166/280.2 |
| 6,632,778 B1 * | 10/2003 | Ayoub et al. | 507/202 |
| 7,136,841 B2 | 11/2006 | Cook | |
| 7,255,169 B2 | 8/2007 | van Batenburg et al. | |
| 7,281,583 B2 | 10/2007 | Whitfill et al. | |
| 7,334,635 B2 | 2/2008 | Nguyen | |
| 7,334,636 B2 | 2/2008 | Nguyen | |
| 7,392,847 B2 | 7/2008 | Gatlin et al. | |
| 7,541,318 B2 | 6/2009 | Weaver et al. | |
| 7,766,099 B2 | 8/2010 | Nguyen | |
| 7,819,192 B2 | 10/2010 | Weaver et al. | |
| 7,926,591 B2 | 4/2011 | Nguyen et al. | |
| 2004/0173354 A1 * | 9/2004 | Hinkel et al. | 166/308.5 |
| 2004/0226717 A1 | 11/2004 | Reddy et al. | |
| 2005/0006093 A1 | 1/2005 | Nguyen | |
| 2005/0194135 A1 | 9/2005 | Nguyen et al. | |
| 2006/0234871 A1 | 10/2006 | Dalrymple et al. | |
| 2008/0257553 A1 | 10/2008 | Gatlin et al. | |
| 2009/0253594 A1 | 10/2009 | Dalrymple et al. | |
| 2012/0205107 A1 | 8/2012 | Rickman | |

FOREIGN PATENT DOCUMENTS

GB 2 431 949 A 5/2007

OTHER PUBLICATIONS

Official Action for Australian Patent Application No. 2007213494 dated Feb. 7, 2011.
Notice of Allowance and Notice of Allowability for U.S. Appl. No. 12/319,730 dated Feb. 15, 2011.
Office Action for U.S. Appl. No. 11/880,230 dated Apr. 6, 2011.
Office Action for U.S. Appl. No. 12/070,301 dated Apr. 19, 2011.
SPE 106112, "Zeta Potential Altering System for Increased Fluid Recovery, Production, and Fines Control," Kakadjian, et al., Feb.-Mar. 2007.
SPE 128048, "Enhancing Gas and Oil Production With Zeta Potential Altering System," Johnson et al., Feb. 2010.
Office Action for U.S. Appl. No. 12/070,301 dated Aug. 12, 2011.
Office Action for U.S. Appl. No. 12/319,730 dated Dec. 15, 2010.
Office Action for U.S. Appl. No. 11/880,230 dated Dec. 23, 2010.

* cited by examiner

*Primary Examiner* — Angela M DiTrani
(74) *Attorney, Agent, or Firm* — Robert A. Kent; McDermott Will & Emery LLP

(57) ABSTRACT

Methods comprising mixing particulates with a consolidating agent emulsion to form a slurry; creating a foamed slurry by adding a foaming agent and a gas to the slurry; placing the foamed slurry into a portion of a subterranean formation so as to create a particulate pack; and flushing the particulate pack with a postflush fluid. In some embodiments, the consolidating agent emulsion composition comprises a resin composition.

22 Claims, 9 Drawing Sheets

METHODS AND COMPOSITIONS FOR PACKING VOID SPACES AND STABILIZING FORMATIONS SURROUNDING A WELLBORE

CROSS-REFERENCE TO RELATED APPLICATIONS

The present application is a continuation-in-part of U.S. patent application Ser. No. 11/880,230, entitled "Consolidating Agent Emulsions and Associated Methods," filed Aug. 30, 2007 and published as 2007/0298781, which is a continuation-in-part of U.S. patent application Ser. No. 11/351,931, entitled "Consolidating Agent Emulsions and Associated methods," filed Feb. 10, 2006 and issued as U.S. Pat. No. 7,819,192, the entirety of which are herein incorporated by reference.

BACKGROUND

The present invention relates to methods and compositions useful in treating subterranean formations, and more particularly, to consolidating relatively unconsolidated portions of subterranean formations and minimizing the flow back of unconsolidated particulate material (referred to collectively herein as "particulate migration.") This invention also relates to modifying the stress-activated reactivity of subterranean fracture faces and other surfaces in subterranean formations.

In the production of hydrocarbons from a subterranean formation, the subterranean formation preferably should be sufficiently conductive to permit desirable fluids, such as oil and gas, to flow to a well bore that penetrates a subterranean formation. One type of treatment that may be used to increase the conductivity of a subterranean formation is hydraulic fracturing. Hydraulic fracturing operations generally involve pumping a treatment fluid (e.g., a fracturing fluid or a "pad" fluid) into a well bore that penetrates a subterranean formation at a sufficient hydraulic pressure to create or enhance one or more fractures in the subterranean formation. The fluid used in the treatment may comprise particulates, often referred to as "proppant particulates," that are deposited in the resultant fractures. These proppant particulates are thought to prevent the fractures from fully closing upon the release of hydraulic pressure, forming conductive channels through which fluids may flow to a well bore. The term "propped fracture" as used herein refers to a fracture (naturally-occurring or otherwise) in a portion of a subterranean formation that contains at least a plurality of proppant particulates. The term "proppant pack" refers to a collection of proppant particulates within a fracture.

A type of particulate migration that may affect fluid conductivity in the formation is the flow back of unconsolidated particulate material (e.g., formation fines, proppant particulates, etc.) through the conductive channels in the subterranean formation, which can, for example, clog the conductive channels and/or damage the interior of the formation or equipment. There are several known techniques used to control particulate migration, some of which may involve the use of consolidating agents. The term "consolidating agent" as used herein includes any compound that is capable of minimizing particulate migration in a subterranean formation and/or modifying the stress-activated reactivity of subterranean fracture faces and other surfaces in subterranean formations.

One well-known technique used to control particulate migration in subterranean formations is commonly referred to as "gravel packing," which involves the placement of a filtration bed of gravel particulates in the subterranean formation that acts as a barrier to prevent particulates from flowing into the well bore and in the annulus between the wellbore and a production screen which has been installed in the wellbore. These gravel packing operations may involve the use of consolidating agents to bind the gravel particulates together in order to form a porous matrix through which formation fluids can pass.

In some situations, a hydraulic fracturing treatment and a gravel-packing treatment may be combined into a single treatment (commonly referred to as FRACPAC™ operations). In such "frac pack" operations, the fracturing and gravel-packing treatments are combined and may generally be completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Another technique that may be used to control particulate migration involves coating proppant particulates with a consolidating agent to facilitate their consolidation within the formation and to prevent their subsequent flow-back through the conductive channels in the subterranean formation.

Another method used to control particulate migration involves consolidating unconsolidated portions of subterranean zones into relatively stable permeable masses by applying a consolidating agent to an unconsolidated portion of the subterranean formation. One example of this method is applying a resin to a portion of the zone, followed by a spacer fluid and then a catalyst. Such resin application may be problematic when, for example, an insufficient amount of spacer fluid is used between the application of the resin and the application of the external catalyst. In that case, the resin may come into contact with the external catalyst earlier in the process such as in the well bore itself rather than in the unconsolidated subterranean formation. Furthermore, there may be uncertainty as to whether there is adequate contact between the resin and the catalyst. The terms "catalyst," "hardening agent," and "curing agent" may be used herein interchangeably and collectively may refer to a composition that effects the hardening of a resin composition by any means or mechanism. Another example of this method involves applying a tackifying composition (aqueous or non-aqueous) to a portion of the formation in an effort to reduce the migration of particulates therein. Whereas a curable resin composition produces a hard mass, the use of a tackifying composition is thought to result in a more malleable consolidated mass.

Although consolidating agents are used frequently, they may be difficult to handle, transport and clean-up due to their inherent tendency to stick to equipment or anything else with which they may come into contact. Therefore, it would be desirable to provide compositions and methods that would, among other things, help ease the handling, transport and clean up when using consolidating agents.

One additional problem that can negatively impact conductivity and further complicate the effects of particulate migration is the tendency of mineral surfaces in a subterranean formation to undergo chemical reactions caused, at least in part, by conditions created by mechanical stresses on those minerals (e.g., fracturing of mineral surfaces, compaction of mineral particulates). These reactions are herein referred to as "stress-activated reactions" or "stress-activated reactivity." As used herein, the term "mineral surface in a subterranean formation" and derivatives thereof refer to any surface in a subterranean formation comprised of minerals and/or the surface of a particulate. These minerals may comprise any mineral found in subterranean formations, including silicate minerals (e.g., quartz, feldspars, clay minerals), carbonaceous minerals, metal oxide minerals, and the like. The mineral surface in a subterranean formation treated in the methods of the present invention may have been formed at any time. The term "modifying the stress-activated reactivity of a mineral surface" and its derivatives as used herein refers to increasing or decreasing the tendency of a mineral surface in a subterranean formation to undergo one or more stress-activated reactions, or attaching a compound to the mineral surface that is capable of participating in one or more subsequent reactions with a second compound.

One type of reaction caused, at least in part, by conditions created by mechanical stresses on minerals may be referred to as a diagenic reaction, which also may be known as a "diageneous reaction." As used herein, the terms "diagenic reaction," "diagenic reactivity," and "diagenesis" or any derivatives thereof include chemical and physical processes that move a portion of a mineral sediment and/or convert the mineral sediment into some other mineral form in the presence of water. A mineral sediment that has been so moved or converted is herein referred to as a "diagenic product." Any mineral sediment may be susceptible to these diagenic reactions, including silicate minerals (e.g., quartz, feldspars, scale, clay minerals), carbonaceous minerals, metal oxide minerals, and the like.

Two mechanisms that diagenic reactions are thought to involve are pressure solution and precipitation processes. Where two water-wetted mineral surfaces are in contact with each other at a point under strain, the localized mineral solubility near that point is thought to increase, causing the minerals to dissolve. Minerals in solution may diffuse through the water film outside of the region where the mineral surfaces are in contact (e.g., in the pore spaces of a proppant pack), where they may precipitate out of solution. The dissolution and precipitation of minerals in the course of these reactions may reduce the conductivity of the formations by, among other things, clogging the conductive channels in the formation with mineral precipitate and/or collapsing those conductive channels by dissolving solid minerals in the surfaces of those channels.

Moreover, in the course of a fracturing treatment, new mineral surfaces may be created in the "walls" surrounding the open space of the fracture. These new walls created in the course of a fracturing treatment are herein referred to as "fracture faces." Such fracture faces may exhibit different types and levels of reactivity, for example, stress-activated reactivity. In some instances, fracture faces may exhibit an increased tendency to undergo diagenic reactions. In other instances, fracture faces also may exhibit an increased tendency to react with substances in formation fluids and/or treatment fluids that are in contact with those fracture faces, such as water, polymers (e.g., polysaccharides, biopolymers, surfactants, etc.), and other substances commonly found in these fluids, whose molecules may become anchored to the fracture face. This reactivity may further decrease the conductivity of the formation through, inter alia, increased diagenic reactions and/or the obstruction of conductive fractures in the formation by any molecules that have become anchored to the fracture faces.

SUMMARY

The present invention relates to methods and compositions useful for minimizing particulate migration. This invention also relates to modifying the stress-activated reactivity of subterranean fracture faces and other surfaces in subterranean formations.

In one embodiment, the present invention provides a method comprising: mixing particulates with a consolidating agent emulsion to form a slurry; creating a foamed slurry by adding a foaming agent and a gas to the slurry; placing the foamed slurry into a portion of a subterranean formation so as to create a particulate pack; and flushing the particulate pack with a postflush fluid.

In yet another embodiment, the present invention provides a method comprising mixing particulates with a consolidating agent emulsion to form a slurry; creating a foamed slurry by adding a foaming agent and a gas to the slurry; placing the foamed slurry into a portion of a subterranean formation so as to create a particulate pack; flushing the particulate pack with a postflush fluid; and, placing a second consolidating fluid into substantially the same portion of the subterranean formation.

The features and advantages of the present invention will be readily apparent to those skilled in the art. While numerous changes may be made by those skilled in the art, such changes are within the spirit of the invention.

BRIEF DESCRIPTION OF DRAWINGS

These drawings illustrate certain aspects of some of the embodiments of the present invention, and should not be used to limit or define the invention.

DETAILED DESCRIPTION

Figure 1:
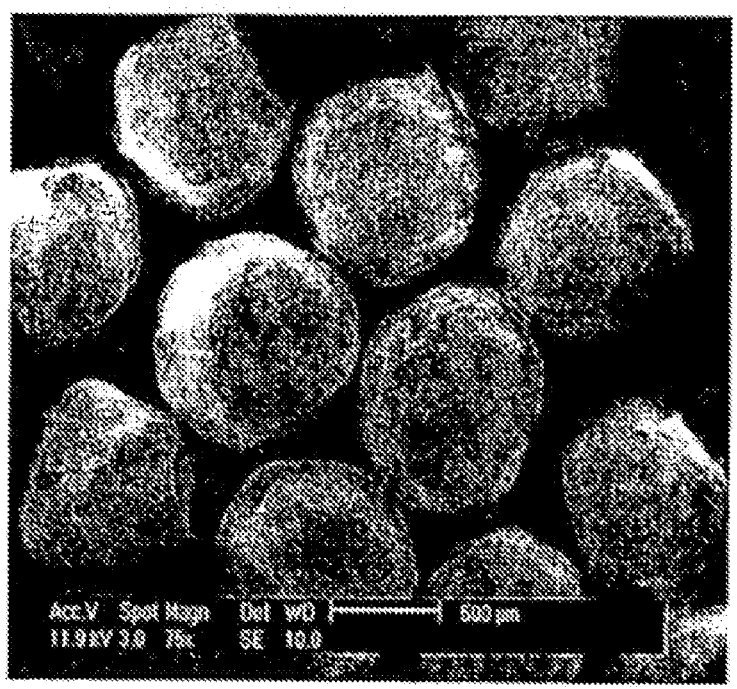
FIG. 1 is a micrograph image of untreated proppant particulates.

The present invention relates to methods and compositions useful for minimizing particulate migration. This invention also relates to modifying the stress-activated reactivity of subterranean fracture faces and other surfaces in subterranean formations.

One of the many potential advantages of the methods and compositions of the present invention is that they may allow, inter alia, for the consolidation of relatively unconsolidated portions of subterranean formations and may also minimize the flow back of unconsolidated particulate material. As a result, in some embodiments, it may be possible to utilize larger sized proppant particulates that provide higher conductivity, without damage to the proppant pack due to formation fines movement and without compromising proppant flow back control requirements. It is also possible, in some embodiments, to minimize the amount of consolidating agent that might otherwise be required through the use of a consolidating agent emulsion, to achieve, inter alia, good strength performance and high regained permeability of the subterranean formation.

In addition, in some embodiments, the consolidating agent emulsions of the present invention may also eliminate the need for an expensive and/or flammable solvent that might otherwise be necessary when using consolidating agents and may thereby reduce possible undesirable safety and environmental concerns related to the use and disposal of such solvents. In some embodiments, the consolidating agent emulsions may also reduce the possibility of oil sheen, which may be of particular importance in the coastline along the Gulf of Mexico or other gulf coast regions. Furthermore, the consolidating agent emulsions of the present invention may also allow for relatively easy clean up of equipment and reduced potential damage to equipment due to the buildup of the consolidation agent on the equipment.

In some embodiments, methods may include mixing particulates with a consolidating agent emulsion to form a slurry, forming a foamed slurry by adding a foaming agent and a gas, creating a particulate pack by placing the foamed slurry into a subterranean formation, and postflushing the particulate pack.

A method of controlling particulates in unconsolidated formations involves placing a filtration bed containing gravel (e.g., a "gravel pack") near the well bore to present a physical barrier to the transport of unconsolidated formation fines with the production of desired fluids. Typically, such "gravel-packing operations" involve the pumping and placement of a quantity of certain particulates into the unconsolidated formation in an area adjacent to a well bore. One common type of gravel-packing operation involves placing a screen in the well bore and packing the surrounding annulus between the screen and the well bore with gravel of a specific size designed to prevent the passage of formation sand. The screen is generally a filter assembly used to retain the gravel placed during the gravel-pack operation. A wide range of sizes and screen configurations are available to suit the characteristics of the gravel-pack sand used. Similarly, a wide range of sizes of gravel is available to suit the characteristics of the unconsolidated particulates in the subterranean formation. To install the gravel pack, the gravel is carried to the formation in the form of a slurry by mixing the gravel with a consolidating agent emulsion. The resulting structure presents a barrier to migrating sand from the formation while still permitting fluid flow. Gravel packs act, inter alia, to stabilize the formation while causing minimal impairment to well productivity. The gravel, inter alia, acts to prevent formation particulates from plugging the screen or migrating with the produced fluids, and the screen, inter alia, acts to prevent the gravel from entering the production tubing. In some embodiments, a proppant pack is installed in a manner similar to a gravel pack, with proppant being substituted for the gravel. Whether the particulates used to form a particulate pack are gravel, proppant, or other materials, the particulates may be present in the slurry in concentrations ranging from about 0.5 pounds per gallon (ppg) to about 24 ppg. In other embodiments, the concentrations may be below about 2 ppg or from about 0.5 ppg to about 1 ppg. In other embodiments still, concentrations may be above about 0.15 ppg. The slurry may be foamed before being placed in the wellbore.

A. Examples of Certain Embodiments of the Consolidating Agent Emulsions of the Present Invention The consolidating agent emulsions of the present invention comprise an aqueous fluid, an emulsifying agent, and a consolidating agent. In some embodiments, these consolidating agent emulsions have an aqueous external phase and organic based internal phase. The term "emulsion" and any derivatives thereof as used herein refers to a mixture of two or more immiscible phases and includes, but is not limited to, dispersions and suspensions.

1. Examples of Suitable Aqueous Fluids

The consolidating agent emulsions of the present invention comprise an aqueous external phase comprising an aqueous fluid. Suitable aqueous fluids that may be used in the consolidating agent emulsions of the present invention include fresh water, salt water, brine, seawater, or any other aqueous fluid that, preferably, does not adversely react with the other components used in accordance with this invention or with the subterranean formation. One should note, however, that if long-term stability of the emulsion is desired, in some embodiments, the preferred aqueous fluid may be one that is substantially free of salts. It is within the ability of one skilled in the art with the benefit of this disclosure to determine if and how much salt may be tolerated in the consolidating agent emulsions of the present invention before it becomes problematic for the stability of the emulsion. The aqueous fluid may be present in the consolidating agent emulsions of the present invention in an amount in the range of about 20% to about 99.9% by weight of the consolidating agent emulsion composition. In some embodiments, the aqueous fluid may be present in the consolidating agent emulsions of the present invention in an amount in the range of about 60% to about 99.9% by weight of the consolidating agent emulsion composition. In some embodiments, the aqueous fluid may be present in the consolidating agent emulsions of the present invention in an amount in the range of about 95% to about 99.9% by weight of the consolidating agent emulsion composition. Other ranges may be suitable as well, depending on the other components of the emulsion.

2. Examples of Suitable Types of Consolidating Agents

The consolidating agents suitable for use in the compositions and methods of the present invention generally comprise any compound that is capable of minimizing particulate migration and/or modifying the stress-activated reactivity of subterranean fracture faces and other surfaces in subterranean formations. In some embodiments, the consolidating agent may comprise compounds such as non-aqueous tackifying agents and resins. The consolidating agents may be present in the consolidating agent emulsions of the present invention in an amount in the range of about 0.1% to about 80% by weight of the consolidating agent emulsion composition. In some embodiments, the consolidating agent may be present in the consolidating agent emulsions of the present invention in an amount in the range of about 0.1% to about 40% by weight of the composition. In some embodiments, the consolidating agent may be present in the consolidating agent emulsions of the present invention in an amount in the range of about 0.1% to about 5% by weight of the composition. The type and amount of consolidating agent included in a particular composition or method of the invention may depend upon, among other factors, the composition and/or temperature of the subterranean formation, the chemical composition of formations fluids, flow rate of fluids present in the formation, the effective porosity and/or permeability of the subterranean formation, pore throat size and distribution, and the like. Furthermore, the concentration of the consolidating agent can be varied, inter alia, to either enhance bridging to provide for a more rapid coating of the consolidating agent or to minimize bridging to allow deeper penetration into the subterranean formation. It is within the ability of one skilled in the art, with the benefit of this disclosure, to determine the type and amount of consolidating agent to include in the consolidating agent emulsions of the present invention to achieve the desired results.

The consolidating agents suitable for use in the present invention may be provided in any suitable form, including in a particle form, which may be in a solid form and/or a liquid form. In those embodiments where the consolidating agent is provided in a particle form, the size of the particle can vary widely. In some embodiments, the consolidating agent particles may have an average particle diameter of about 0.01 micrometers ("μm") to about 300 μm. In some embodiments, the consolidating agent particles may have an average particle diameter of about 0.01 μm to about 100 μm. In some embodiments, the consolidating agent particles may have an average particle diameter of about 0.01 μm to about 10 μm. The size distribution of the consolidating agent particles used in a particular composition or method of the invention may depend upon several factors including, but not limited to, the size distribution of the particulates present in the subterranean formation, the effective porosity and/or permeability of the subterranean formation, pore throat size and distribution, and the like.

In some embodiments, it may be desirable to use a consolidating agent particle with a size distribution such that the consolidating agent particles are placed at contact points between formation particulates. For example, in some embodiments, the size distribution of the consolidating agent particles may be within a smaller size range, e.g. of about 0.01 μm to about 10 μm. It may be desirable in some embodiments to provide consolidating agent particles with a smaller particle size distribution, inter alia, to promote deeper penetration of the consolidating agent particles through a body of unconsolidated particulates or in low permeability formations.

In other embodiments, the size distribution of the consolidating agent particles may be within a larger range, e.g. of about 30 μm to about 300 μm. It may be desirable in some embodiments to provide consolidating agent particles with a larger particle size distribution, inter alia, to promote the filtering out of consolidating agent particles at or near the spaces between neighboring unconsolidated particulates or in high permeability formations. A person of ordinary skill in the art, with the benefit of this disclosure, will be able to select an appropriate particle size distribution for the consolidating agent particles suitable for use in the present invention and will appreciate that methods of creating consolidating agent particles of any relevant size are well known in the art.

a. Non-aqueous Tackifying Agents

In some embodiments of the present invention, the consolidating agent may comprise a non-aqueous tackifying agent. As used herein "tackifying agent" refers to a non-hardening substance that has a nature such that it is (or may be activated to become) somewhat sticky to the touch. As such, the term "tackifying agent" includes, but is not limited to, aggregating agents, agglomerating agents and surface modification agents. These include compositions that are used in changing or modifying the aggregation potential and/or zeta potential of the particulates or substrate surfaces even though such zeta potential modifications may not result in a "tacky" substance.

A particularly preferred group of non-aqueous tackifying agents comprises polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation.

Additional compounds which may be used as non-aqueous tackifying agents include liquids and solutions of, for example, polyesters, polycarbonates, silyl-modified polyamide compounds, polycarbamates, urethanes, natural resins such as shellac, and the like.

Other suitable non-aqueous tackifying agents are described in U.S. Pat. Nos. 5,853,048 and 5,833,000 both issued to Weaver, et al., and U.S. Pat. Nos. 7,392,847 and 7,350,579 both issued to Gatlin et al., the relevant disclosures of which are herein incorporated by reference.

Non-aqueous tackifying agents suitable for use in the present invention may either be used such that they form a non-hardening coating on a surface or they may be combined with a multifunctional material capable of reacting with the non-aqueous tackifying agent to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the non-aqueous tackifying agent may function similarly to a hardenable resin.

Multifunctional materials suitable for use in the present invention include, but are not limited to, aldehydes, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde, aldehyde condensates, and silyl-modified polyamide compounds and the like, and combinations thereof. Suitable silyl-modified polyamide compounds that may be used in the present invention are those that are substantially self-hardening compositions capable of at least partially adhering to a surface or to a particulate in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some embodiments of the present invention, the multi-functional material may be mixed with the tackifying compound in an amount of about 0.01% to about 50% by weight of the tackifying compound to effect formation of the reaction product. In other embodiments, the multifunctional material is present in an amount of about 0.5% to about 1% by weight of the tackifying compound. Suitable multifunctional materials are described in U.S. Pat. No. 5,839,510 issued to Weaver, et al., the relevant disclosure of which is herein incorporated by reference.

b. Resins

In some embodiments of the present invention, the consolidating agent may comprise a resin. The term "resin" as used herein refers to any of numerous physically similar polymerized synthetics or chemically modified natural resins including thermoplastic materials and thermosetting materials. Resins suitable for use in the present invention include substantially all resins known and used in the art.

One type of resin suitable for use in the compositions and methods of the present invention is a two-component epoxy based resin comprising a liquid hardenable resin component and a liquid hardening agent component. The liquid hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well, the surrounding weather conditions, and the desired long-term stability of the consolidating agent emulsion. An alternate way to reduce the viscosity of the hardenable resin is to heat it. The second component is the liquid hardening agent component, which is comprised of a hardening agent, an optional silane coupling agent, a surfactant, an optional hydrolyzable ester for, among other things, breaking gelled fracturing fluid films on proppant particulates, and an optional liquid carrier fluid for, among other things, reducing the viscosity of the hardening agent component.

Examples of hardenable resins that can be used in the liquid hardenable resin component include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins and combinations thereof. In some embodiments, the hardenable resin may comprise a urethane resin. Examples of suitable urethane resins may comprise a polyisocyanate component and a polyhydroxy component. Examples of suitable hardenable resins, including urethane resins, that may be suitable for use in the methods of the present invention include those described in U.S. Pat. No. 6,582,819 issued to McDaniel, et al., U.S. Pat. No. 4,585,064 issued to Graham, et al., U.S. Pat. No. 6,677,426 issued to Noro, et al., and U.S. Pat. No. 7,153,575 issued to Anderson, et al., the relevant disclosures of which are herein incorporated by reference.

The hardenable resin may be included in the liquid hardenable resin component in an amount in the range of about 5% to about 100% by weight of the liquid hardenable resin component. It is within the ability of one skilled in the art with the benefit of this disclosure to determine how much of the liquid hardenable resin component may be needed to achieve the desired results. Factors that may affect this decision include which type of liquid hardenable resin component and liquid hardening agent component are used.

Any solvent that is compatible with the hardenable resin and achieves the desired viscosity effect may be suitable for use in the liquid hardenable resin component. Suitable solvents may include butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred solvents may include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin composition chosen and is within the ability of one skilled in the art with the benefit of this disclosure.

As described above, use of a solvent in the liquid hardenable resin component is optional but may be desirable to reduce the viscosity of the hardenable resin component for ease of handling, mixing, and transferring. However, as previously stated, it may be desirable in some embodiments to not use such a solvent for environmental or safety reasons. It is within the ability of one skilled in the art, with the benefit of this disclosure, to determine if and how much solvent is needed to achieve a suitable viscosity. In some embodiments, the amount of the solvent used in the liquid hardenable resin component may be in the range of about 0.1% to about 30% by weight of the liquid hardenable resin component. Optionally, the liquid hardenable resin component may be heated to reduce its viscosity, in place of, or in addition to, using a solvent.

Examples of the hardening agents that can be used in the liquid hardening agent component include, but are not limited to, cyclo-aliphatic amines, such as piperazine, derivatives of piperazine (e.g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; 2-ethyl-4-methyl imidazole; and combinations thereof. The chosen hardening agent often effects the range of temperatures over which a hardenable resin is able to cure. By way of example and not of limitation, in subterranean formations having a temperature of about 60° F. to about 250° F., amines and cyclo-aliphatic amines such as piperidine, triethylamine, tris(dimethylaminomethyl) phenol, and dimethylaminomethyl)phenol may be preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 50° F. to as high as about 350° F.

The hardening agent used may be included in the liquid hardening agent component in an amount sufficient to at least partially harden the resin composition. In some embodiments of the present invention, the hardening agent used is included in the liquid hardening agent component in the range of about 0.1% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

In some embodiments, the consolidating agent emulsions of the present invention may comprise a liquid hardenable resin component emulsified in a liquid hardening agent component, wherein the liquid hardenable resin component is the internal phase of the emulsion and the liquid hardening agent component is the external phase of the emulsion. In other embodiments, the liquid hardenable resin component may be emulsified in water and the liquid hardening agent component may be present in the water. In other embodiments, the liquid hardenable resin component may be emulsified in water and the liquid hardening agent component may be provided separately. Similarly, in other embodiments, both the liquid hardenable resin component and the liquid hardening agent component may both be emulsified in water.

The optional silane coupling agent may be used, among other things, to act as a mediator to help bond the resin to formation particulates or proppant particulates. Examples of suitable silane coupling agents include, but are not limited to, N-2-(aminoethyl)-3-aminopropyltrimethoxysilane, 3-glycidoxypropyltrimethoxysilane, and combinations thereof. The silane coupling agent may be included in the liquid hardening agent component in an amount capable of sufficiently bonding the resin to the particulate. In some embodiments of the present invention, the silane coupling agent used is included in the liquid hardening agent component in the range of about 0.1% to about 3% by weight of the liquid hardening agent component.

Any surfactant compatible with the hardening agent and capable of facilitating the coating of the resin onto particulates in the subterranean formation may be used in the liquid hardening agent component. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,773 issued to Todd et al. on Nov. 6, 2001, the relevant disclosure of which is incorporated herein by reference. The surfactant or surfactants that may be used are included in the liquid hardening agent component in an amount in the range of about 1% to about 10% by weight of the liquid hardening agent component.

While not required, examples of hydrolyzable esters that may be used in the liquid hardening agent component include, but are not limited to, a mixture of dimethylglutarate, dimethyladipate, and dimethylsuccinate; dimethylthiolate; methyl salicylate; dimethyl salicylate; dimethylsuccinate; and combinations thereof. When used, a hydrolyzable ester is included in the liquid hardening agent component in an amount in the range of about 0.1% to about 3% by weight of the liquid hardening agent component. In some embodiments a hydrolyzable ester is included in the liquid hardening agent component in an amount in the range of about 1% to about 2.5% by weight of the liquid hardening agent component.

Use of a diluent or liquid carrier fluid in the liquid hardening agent component is optional and may be used to reduce the viscosity of the liquid hardening agent component for ease of handling, mixing and transferring. As previously stated, it may be desirable in some embodiments to not use such a solvent for environmental or safety reasons. Any suitable carrier fluid that is compatible with the liquid hardening agent component and achieves the desired viscosity effects is suitable for use in the present invention. Some suitable liquid carrier fluids are those having high flash points (e.g., about 125° F.) because of, among other things, environmental and safety concerns; such solvents include, but are not limited to, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other suitable liquid carrier fluids include aqueous dissolvable solvents such as, for example, methanol, isopropanol, butanol, glycol ether solvents, and combinations thereof. Suitable glycol ether liquid carrier fluids include, but are not limited to, diethylene glycol methyl ether, dipropylene glycol methyl ether, 2-butoxy ethanol, ethers of a $C_2$ to $C_6$ dihydric alkanol having at least one $C_1$ to $C_6$ alkyl group, mono ethers of dihydric alkanols, methoxypropanol, butoxyethanol, hexoxyethanol, and isomers thereof. Selection of an appropriate liquid carrier fluid is dependent on, inter alia, the resin composition chosen.

Other resins suitable for use in the present invention are furan-based resins. Suitable furan-based resins include, but are not limited to, furfuryl alcohol resins, furfural resins, mixtures furfuryl alcohol resins and aldehydes, and a mixture of furan resins and phenolic resins. Of these, furfuryl alcohol resins may be preferred. A furan-based resin may be combined with a solvent to control viscosity if desired. Suitable solvents for use in the furan-based consolidation fluids of the present invention include, but are not limited to 2-butoxy ethanol, butyl lactate, butyl acetate, tetrahydrofurfuryl methacrylate, tetrahydrofurfuryl acrylate, esters of oxalic, maleic and succinic acids, and furfuryl acetate. Of these, 2-butoxy ethanol is preferred. In some embodiments, the furan-based resins suitable for use in the present invention may be capable of enduring temperatures well in excess of 350° F. without degrading. In some embodiments, the furan-based resins suitable for use in the present invention are capable of enduring temperatures up to about 700° F. without degrading.

Optionally, the furan-based resins suitable for use in the present invention may further comprise a curing agent, inter alia, to facilitate or accelerate curing of the furan-based resin at lower temperatures. The presence of a curing agent may be particularly useful in embodiments where the furan-based resin may be placed within subterranean formations having temperatures below about 350° F. Examples of suitable curing agents include, but are not limited to, organic or inorganic acids, such as, inter alia, maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), and combinations thereof. In those embodiments where a curing agent is not used, the furan-based resin may cure autocatalytically.

Still other resins suitable for use in the methods of the present invention are phenolic-based resins. Suitable phenolic-based resins include, but are not limited to, terpolymers of phenol, phenolic formaldehyde resins, and a mixture of phenolic and furan resins. In some embodiments, a mixture of phenolic and furan resins may be preferred. A phenolic-based resin may be combined with a solvent to control viscosity if desired. Suitable solvents for use in the present invention include, but are not limited to butyl acetate, butyl lactate, furfuryl acetate, and 2-butoxy ethanol. Of these, 2-butoxy ethanol may be preferred in some embodiments.

Yet another resin-type material suitable for use in the methods of the present invention is a phenol/phenol formaldehyde/furfuryl alcohol resin comprising of about 5% to about 30% phenol, of about 40% to about 70% phenol formaldehyde, of about 10% to about 40% furfuryl alcohol, of about 0.1% to about 3% of a silane coupling agent, and of about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, and 3-glycidoxypropyltrimethoxysilane. Suitable surfactants include, but are not limited to, an ethoxylated nonyl phenol phosphate ester, mixtures of one or more cationic surfactants, and one or more non-ionic surfactants and an alkyl phosphonate surfactant.

In some embodiments, resins suitable for use in the consolidating agent emulsion compositions of the present invention may optionally comprise filler particles. Suitable filler particles may include any particle that does not adversely react with the other components used in accordance with this invention or with the subterranean formation. Examples of suitable filler particles include silica, glass, clay, alumina, fumed silica, carbon black, graphite, mica, meta-silicate, calcium silicate, calcine, kaoline, talc, zirconia, titanium dioxide, fly ash, boron, and combinations thereof. In some embodiments, the filler particles may range in size of about 0.01 µm to about 100 µm. As will be understood by one skilled in the art, particles of smaller average size may be particularly useful in situations where it is desirable to obtain high proppant pack permeability (i.e., conductivity), and/or high consolidation strength. In certain embodiments, the filler particles may be included in the resin composition in an amount of about 0.1% to about 70% by weight of the resin composition. In other embodiments, the filler particles may be included in the resin composition in an amount of about 0.5% to about 40% by weight of the resin composition. In some embodiments, the filler particles may be included in the resin composition in an amount of about 1% to about 10% by weight of the resin composition. Some examples of suitable resin compositions comprising filler particles are described in U.S. Ser. No. 11/482,601 issued to Rickman, et al. and published as 2008/0006405, the relevant disclosure of which is herein incorporated by reference.

3. Examples of Suitable Emulsifying Agents

As previously stated, the consolidating agent emulsions of the present invention comprise an emulsifying agent. Examples of suitable emulsifying agents may include surfactants, proteins, hydrolyzed proteins, lipids, glycolipids, and nanosized particulates, including, but not limited to fumed silica.

Surfactants suitable for use in the present invention are those capable of emulsifying an organic based component in an aqueous based component so that the emulsion has an aqueous external phase and an organic internal phase. In some embodiments, the surfactant may comprise an amine surfactant. Such preferred amine surfactants include, but are not limited to, amine ethoxylates and amine ethoxylated quaternary salts such as tallow diamine and tallow triamine exthoxylates and quaternary salts. Examples of suitable surfactants are ethoxylated $C_{12}$-$C_{22}$ diamine, ethoxylated $C_{12}$-$C_{22}$ triamine, ethoxylated $C_{12}$-$C_{22}$ tetraamine, ethoxylated $C_{12}$-$C_{22}$ diamine methylchloride quat, ethoxylated $C_{12}$-$C_{22}$ triamine methylchloride quat, ethoxylated $C_{12}$-$C_{22}$ tetraamine methylchloride quat, ethoxylated $C_{12}$-$C_{22}$ diamine reacted with sodium chloroacetate, ethoxylated $C_{12}$-$C_{22}$ triamine reacted with sodium chloroacetate, ethoxylated $C_{12}$-$C_{22}$ tetraamine reacted with sodium chloroacetate, ethoxylated $C_{12}$-$C_{22}$ diamine acetate salt, ethoxylated $C_{12}$-$C_{22}$ diamine hydrochloric acid salt, ethoxylated $C_{12}$-$C_{22}$ diamine glycolic acid salt, ethoxylated $C_{12}$-$C_{22}$ diamine DDBSA salt, ethoxylated $C_{12}$-$C_{22}$ triamine acetate salt, ethoxylated $C_{12}$-$C_{22}$ triamine hydrochloric acid salt, ethoxylated $C_{12}$-$C_{22}$ triamine glycolic acid salt, ethoxylated $C_{12}$-$C_{22}$ triamine DDBSA salt, ethoxylated $C_{12}$-$C_{22}$ tetraamine acetate salt, ethoxylated $C_{12}$-$C_{22}$ tetraamine hydrochloric acid salt, ethoxylated $C_{12}$-$C_{22}$ tetraamine glycolic acid salt, ethoxylated $C_{12}$-$C_{22}$ tetraamine DDBSA salt, pentamethylated $C_{12}$-$C_{22}$ diamine quat, heptamethylated $C_{12}$-$C_{22}$ diamine quat, nonamethylated $C_{12}$-$C_{22}$ diamine quat, and combinations thereof.

In some embodiments of the present invention, a suitable amine surfactant may have the general formula:

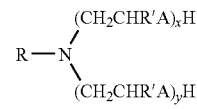

wherein R is a $C_{12}$-$C_{22}$ aliphatic hydrocarbon; R' is independently selected from hydrogen or $C_1$ to $C_3$ alkyl group; A is independently selected from NH or O, and x+y has a value greater than or equal to one but also less than or equal to three. Preferably the R group is a non-cyclic aliphatic. In some embodiments, the R group contains at least one degree of unsaturation, i.e., at least one carbon-carbon double bond. In other embodiments, the R group may be a commercially recognized mixture of aliphatic hydrocarbons such as soya, which is a mixture of $C_{14}$ to $C_{20}$ hydrocarbons, or tallow which is a mixture of $C_{16}$ to $C_{20}$ aliphatic hydrocarbons, or tall oil which is a mixture of $C_{14}$ to $C_{18}$ aliphatic hydrocarbons. In other embodiments, one in which the A group is NH, the value of x+y is preferably two, with x having a preferred value of one. In other embodiments, in which the A group is O, the preferred value of x+y is two, with the value of x being preferably one. One example of a commercially available amine surfactant is TER 2168 Series available from Champion Chemicals located in Fresno, Tex. Other commercially available examples include ETHOMEEN T/12, a diethoxylated tallow amine; ETHOMEEN S/12, a diethoxylated soya amine; DUOMEEN O, a N-oleyl-1,3-diaminopropane; DUOMEEN T, a N-tallow-1,3-diaminopropane; all of which are commercially available from Akzo Nobel.

In other embodiments, the surfactant may be a tertiary alkyl amine ethoxylate (a cationic surfactant). TRITON RW-100 surfactant (x+y=10 moles of ethylene oxide) and TRITON RW-150 surfactant (x+y=15 moles of ethylene oxide) are examples of tertiary alkyl amine ethoxylates that are commercially available from Dow Chemical Company.

In other embodiments, the surfactant may be a combination of an amphoteric surfactant and an anionic surfactant. In some embodiments, the relative amounts of the amphoteric surfactant and the anionic surfactant in the surfactant mixture may be of about 30% to about 45% by weight of the surfactant mixture and of about 55% to about 70% by weight of the surfactant mixture, respectively. The amphoteric surfactant may be lauryl amine oxide, a mixture of lauryl amine oxide and myristyl amine oxide (i.e., a lauryl/myristyl amine oxide), cocoamine oxide, lauryl betaine, oleyl betaine, or combinations thereof, with the lauryl/myristyl amine oxide being preferred. The cationic surfactant may be cocoalkyltriethyl ammonium chloride, hexadecyltrimethyl ammonium chloride, or combinations thereof, with a 50/50 mixture by weight of the cocoalkyltriethyl ammonium chloride and the hexadecyltrimethyl ammonium chloride being preferred.

In other embodiments, the surfactant may be a nonionic surfactant. Examples of suitable nonionic surfactants include, but are not limited to, alcohol oxylalkylates, alkyl phenol oxylalkylates, nonionic esters, such as sorbitan esters, and alkoxylates of sorbitan esters. Examples of suitable surfactants include, but are not limited to, castor oil alkoxylates, fatty acid alkoxylates, lauryl alcohol alkoxylates, nonylphenol alkoxylates, octylphenol alkoxylates, tridecyl alcohol alkoxylates, such as polyoxyethylene ("POE")-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20 oleyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitan tristearate ethoxylate, POE-30 sorbitan tetraoleate ethoxylate, POE-40 sorbitan tetraoleate ethoxylate, POE-6 sorbitan hexastearate ethoxylate, POE-6 sorbitan monstearate ethoxylate, POE-6 sorbitan tetraoleate ethoxylate, and/or POE-60 sorbitan tetrastearate ethoxylate. Preferred nonionic surfactants include alcohol oxyalkyalates such as POE-23 lauryl alcohol and alkyl phenol ethoxylates such as POE (20) nonyl phenyl ether.

While cationic, amphoteric, and nonionic surfactants are preferred, any suitable emulsifying surfactant may be used. Good surfactants for emulsification typically need to be either ionic, to give charge stabilization, to have a sufficient hydrocarbon chain length or cause a tighter packing of the hydrophobic groups at the oil/water interface to increase the stability of the emulsion. One of ordinary skill in the art with the benefit of this disclosure will be able to select a suitable surfactant depending upon the consolidating agent that is being emulsified. Additional suitable surfactants may include other cationic surfactants and even anionic surfactants. Examples include, but are not limited to, hexahydro-1 3,5-tris (2-hydroxyethyl) triazine, alkyl ether phosphate, ammonium lauryl sulfate, ammonium nonylphenol ethoxylate sulfate, branched isopropyl amine dodecylbenzene sulfonate, branched sodium dodecylbenzene sulfonate, dodecylbenzene sulfonic acid, branched dodecylbenzene sulfonic acid, fatty acid sulfonate potassium salt, phosphate esters, POE-1 ammonium lauryl ether sulfate, OE-1 sodium lauryl ether sulfate, POE-10 nonylphenol ethoxylate phosphate ester, POE-12 ammonium lauryl ether sulfate, POE-12 linear phosphate ester, POE-12 sodium lauryl ether sulfate, POE-12 tridecyl alcohol phosphate ester, POE-2 ammonium lauryl ether sulfate, POE-2 sodium lauryl ether sulfate, POE-3 ammonium lauryl ether sulfate, POE-3 disodium alkyl ether sulfosuccinate, POE-3 linear phosphate ester, POE-3 sodium lauryl ether sulfate, POE-3 sodium octylphenol ethoxylate sulfate, POE-3 sodium tridecyl ether sulfate, POE-3 tridecyl alcohol phosphate ester, POE-30 ammonium lauryl ether sulfate, POE-30 sodium lauryl ether sulfate, POE-4 ammonium lauryl ether sulfate, POE-4 ammonium nonylphenol ethoxylate sulfate, POE-4 nonyl phenol ether sulfate, POE-4 nonylphenol ethoxylate phosphate ester, POE-4 sodium lauryl ether sulfate, POE-4 sodium nonylphenol ethoxylate sulfate, POE-4 sodium tridecyl ether sulfate, POE-50 sodium lauryl ether sulfate, POE-6 disodium alkyl ether sulfosuccinate, POE-6 nonylphenol ethoxylate phosphate ester, POE-6 tridecyl alcohol phosphate ester, POE-7 linear phosphate ester, POE-8 nonylphenol ethoxylate phosphate ester, potassium dodecylbenzene sulfonate, sodium 2-ethyl hexyl sulfate, sodium alkyl ether sulfate, sodium alkyl sulfate, sodium alpha olefin sulfonate, sodium decyl sulfate, sodium dodecylbenzene sulfonate, sodium lauryl sulfate, sodium lauryl sulfoacetate, sodium nonylphenol ethoxylate sulfate, and/or sodium octyl sulfate.

Other suitable emulsifying agents are described in U.S. Pat. Nos. 6,653,436 and 6,956,086 both issued to Back, et al., the relevant disclosures of which are herein incorporated by reference.

In some embodiments, the emulsifying agent may function in more than one capacity. For example, in some embodiments, a suitable emulsifying agent may also be a hardening agent. Examples of suitable emulsifying agents that may also function as a hardening agent include, but are not limited to, those described in U.S. Pat. No. 5,874,490, the relevant disclosure of which is herein incorporated by reference.

In some embodiments, the emulsifying agent may be present in the consolidating agent emulsion in an amount in the range of about 0.001% to about 10% by weight of the consolidating agent emulsion composition. In some embodiments, the emulsifying agent may be present in the consolidating agent emulsion in an amount in the range of about 0.05% to about 5% by weight of the consolidating agent emulsion composition.

4. Examples of Optional Additives

Optionally, the consolidating agent emulsions of the present invention may comprise additional additives such as emulsion stabilizers, emulsion destabilizers, antifreeze agents, biocides, algaecides, pH control additives, oxygen scavengers, clay stabilizers, and the like or any other additive that does not adversely affect the consolidating agent emulsion compositions. For instance, an emulsion stabilizer may be beneficial when stability of the emulsion is desired for a lengthened period of time or at specified temperatures. In some embodiments, the emulsion stabilizer may be substantially any acid. In some embodiments, the emulsion stabilizer may be an organic acid, such as acetic acid. In some embodiments, the emulsion stabilizer may be a plurality of nanoparticulates. If an emulsion stabilizer is utilized, it is preferably present in an amount necessary to stabilize the consolidating agent emulsion composition. An emulsion destabilizer may be beneficial when stability of the emulsion is not desired. The emulsion destabilizer may be, inter alia, an alcohol, a pH additive, a surfactant or an oil. If an emulsion destabilizer is utilized, it is preferably present in an amount necessary to break the emulsion. Additionally, antifreeze agents may be beneficial to improve the freezing point of the emulsion. In some embodiments, optional additives may be included in the consolidating agent emulsion in an amount in the range of about 0.001% to about 10% by weight of the consolidating agent emulsion composition. One of ordinary skill in the art with the benefit of this disclosure will recognize that the compatibility of any given additive should be tested to ensure that it does not adversely affect the performance of the consolidating agent emulsion.

In some embodiments, the consolidating agent emulsions of the present invention may further comprise a foaming agent. As used herein, the tem' "foamed" also refers to co-mingled fluids. In certain embodiments, it may desirable that the consolidating agent emulsion is foamed to, inter alia, provide enhanced placement of a consolidating agent emulsion composition and/or to reduce the amount of aqueous fluid that is required, e.g., in water sensitive subterranean formations. Various gases can be utilized for foaming the consolidating agent emulsions of this invention, including, but not limited to, nitrogen, carbon dioxide, air, methane, and mixtures thereof. One of ordinary skill in the art with the benefit of this disclosure will be able to select an appropriate gas that may be utilized for foaming the consolidating agent emulsions of the present invention. In some embodiments, the gas may be present in a consolidating agent emulsion of the present invention in an amount in the range of about 5% to about 98% by volume of the consolidating agent emulsion. In some embodiments, the gas may be present in a consolidating agent emulsion of the present invention in an amount in the range of about 20% to about 80% by volume of the consolidating agent emulsion. In some embodiments, the gas may be present in a consolidating agent emulsion of the present invention in an amount in the range of about 30% to about 70% by volume of the consolidating agent emulsion. The amount of gas to incorporate into the consolidating agent emulsion may be affected by factors including the viscosity of the consolidating agent emulsion and wellhead pressures involved in a particular application.

A foamed slurry may be formed by adding a foaming agent and/or a gas to the particulates and/or consolidating agent emulsion. In some preferred embodiments, a consolidating agent emulsion comprising particulates is foamed before placement into the subterranean environment. In some embodiments, the foamed slurry may have a foam quality in the range of 10% to 90%. The term "foam quality" as used herein means the percentage ratio of the volume of gas to the volume of gas and liquids present under the conditions existing in the subterranean formation. In other embodiments, the foamed slurry may have a foam quality of 50% or greater or 60% or greater.

In those embodiments where it is desirable to foam the consolidating agent emulsions of the present invention, surfactants such as HY-CLEAN (HC-2)™ surface-active suspending agent, PEN-5, or AQF-2™ additive, all of which are commercially available from Halliburton Energy Services, Inc., of Duncan, Okla., may be used. Additional examples of foaming agents that may be utilized to foam and stabilize the consolidating agent emulsions may include, but are not limited to, betaines, amine oxides, methyl ester sulfonates, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Other suitable foaming agents and foam stabilizing agents may be included as well, which will be known to those skilled in the art with the benefit of this disclosure. Once formed, the foamed slurry may be injected into the subterranean formation at a pump rate above a matrix rate or a fracture gradient, causing fractures (or microfractures) to be created (e.g., in the near wellbore region). The foamed slurry may be injected into those fractures, causing the fractures to be quickly screened out.

Other additives may be suitable as well as might be recognized by one skilled in the art with the benefit of this disclosure.

B. Examples of Some Suitable Methods of the Present Invention

The consolidating agent emulsions of the present invention may be used in any suitable subterranean operation in which it is desirable to control particulate migration and/or modify the stress-activated reactivity of subterranean fracture faces and other surfaces in subterranean formations. Additionally, when used in conjunction with a well bore, these methods can be performed at any time during the life of the well.

One example of a method of the present invention comprises: providing a consolidating agent emulsion that comprises an aqueous fluid, an emulsifying agent, and a consolidating agent; and treating at least a plurality of particulates with the consolidating agent emulsion to produce a plurality of consolidating agent coated particulates. In some embodiments, these consolidating agent coated particulates may then be used downhole, for example, in a fracturing or a gravel packing operation. The term "coated particulate" as used herein means particulates that have been at least partially coated with a process comprising a consolidating agent emulsion of the present invention. The particulates may be coated by any suitable method as recognized by one skilled in the art with the benefit of this disclosure. The term "coated" does not imply any particular degree of coverage of the particulates with a consolidating agent.

In other embodiments, the present invention provides a method comprising providing a treatment fluid that comprises a consolidating agent emulsion that comprises an aqueous fluid, an emulsifying agent, and a consolidating agent; and introducing the treatment fluid into a subterranean formation. In some embodiments, the consolidating agent emulsion may then control particulate migration by allowing the consolidating agent to at least partially coat or otherwise become incorporated with the formation surface (note that no specific depth of treatment is implied), and consolidate at least some particulates in a portion of a subterranean formation.

In other embodiments, the present invention provides a method comprising providing a treatment fluid that comprises at least a plurality of particulates coated using a consolidating agent emulsion that comprises an aqueous fluid, an emulsifying agent, and a consolidating agent; introducing the treatment fluid into a subterranean formation; and allowing the consolidating agent to interact with at least a portion of a mineral surface to modify the stress-activated reactivity of at least a portion of a mineral surface in the subterranean formation.

In some embodiments, the consolidating agent emulsions of the present invention may be used, inter alia, in primary, remedial, or proactive methods. Whether a particular method of this invention is "primary," "remedial," or "proactive" is determined relative to the timing of a fracturing treatment or a gravel packing treatment. In some embodiments, a primary method of the present invention may involve using the consolidating agent emulsions of the present invention in conjunction with a fracturing fluid or a gravel pack fluid (e.g., as a component of the fracturing fluid or a gravel pack fluid so that the consolidating agent emulsions of the present invention are introduced into the subterranean formation with the fluid). The remedial methods may be used in wells wherein a portion of the well has previously been fractured and/or propped. The remedial methods also may be used in a gravel packing situation, for example where there has been a screen problem or failure. The proactive methods may be used in wells that have not yet been fractured or gravel packed. In some embodiments, the proactive methods can be performed in conjunction with a fracturing treatment, for example, as a pre-pad to the fracturing treatment or in any diagnostic pumping stage performed before a fracturing, gravel packing, or acidizing procedure.

One of ordinary skill in the art will recognize that the present invention may be useful to stabilize other types of particulates, such as the coatings (also referred to as "grape-skin") left over from some encapsulated materials.

In some embodiments, it may be desirable to utilize a preflush solution prior to the placement of the consolidating agent emulsion compositions in a subterranean formation, inter alia, to remove excess fluids from the pore spaces in the subterranean formation, to clean the subterranean formation, etc. Examples of suitable preflush solutions include, but are not limited to, aqueous fluids, solvents, and surfactants capable of altering the wetability of the formation surface. Examples of suitable preflush solvents may include mutual solvents such as MUSOL and N-VER-SPERSE A, both commercially available from Halliburton Energy Services, Inc., of Duncan, Okla. An example of a suitable preflush surfactant may also include an ethoxylated nonylphenol phosphate ester such as ES-5™ Surfactant, which is commercially available from Halliburton Energy Services, Inc., of Duncan, Okla. Additionally, in those embodiments where the consolidating agent emulsions of the present invention comprise a resin composition, it may be desirable to include a hardening agent in a preflush solution.

Additionally, in some embodiments, it may be desirable to utilize a postflush solution subsequent to the placement of the consolidating agent emulsion compositions in a subterranean formation, inter alia, to displace excess resin from the near well bore region. Examples of suitable postflush solutions include, but are not limited to, aqueous fluids, non-aqueous fluids, solvents, gases, e.g. nitrogen, or any combination thereof. Additionally, in some embodiments, in may be desirable to include a hardening agent in the postflush solution. For example, certain types of resin compositions including, but not limited to, furan based resins, urethane resins, and epoxy based resins, may be catalyzed with a hardening agent placed in a postflush solution. In some embodiments, postflushing the particulate pack includes placing a postflush solution at a bottom of a perforated interval. In certain embodiments, aqueous-based fluids may be preferable due to cost, ease of use, safety issues, cleanup concerns, or other environmental issues.

Below are some additional, but not exclusive, examples of some of the primary, remedial, and proactive methods of the present invention.

1. Primary Methods

In some embodiments, the consolidating agent emulsions of the present invention may be used in a primary method with a well treatment fluid, such as a fracturing fluid or a gravel pack fluid. One example of such a method comprises: providing a fracturing fluid that comprises a consolidating agent emulsion comprising an aqueous fluid, an emulsifying agent, and a consolidating agent; placing the fracturing fluid into a subterranean formation at a pressure sufficient to create or enhance a fracture therein; and allowing the consolidating agent to at least partially consolidate particulates within a portion of the subterranean formation. The fracturing fluids in these primary embodiments may comprise any suitable component usually found in fracturing fluids in view of the characteristics of the formation including, but not limited to, an aqueous base fluid, proppant particulates, gelling agents, surfactants, breakers, buffers, a gas phase (if the fracturing fluid is foamed or commingled), coupling agents, and the like. One of ordinary skill in the art with the benefit of this disclosure will likely recognize the appropriate components in conjunction with a consolidating agent emulsion composition of the present invention for use in a fracturing fluid for a given application.

One example of a primary gravel pack method of the present invention comprises: providing a gravel pack fluid that comprises gravel and a consolidating agent emulsion composition, the consolidating agent emulsion composition comprising an aqueous fluid, an emulsifying agent, and a consolidating agent; contacting a portion of the subterranean formation with the gravel pack fluid so as to place a gravel pack in or near a portion of the subterranean formation; and allowing the consolidating agent to stabilize particulates within the subterranean formation. The gravel pack fluids used in these embodiments may be any suitable gravel pack fluid, and it may comprise those things usually found in gravel pack fluids including, but not limited to, an aqueous base fluid, gravel particulates, gelling agents, surfactants, breakers, buffers, a gas phase (if the fluid is foamed or commingled), and the like. One of ordinary skill in the art with the benefit of this disclosure will likely recognize the appropriate components in conjunction with a consolidating agent emulsion composition of the present invention for use in a gravel pack fluid for a given application.

2. Remedial Measures

In some remedial embodiments of the present invention, after a fracturing treatment or a gravel pack treatment has been performed, the consolidating agent emulsions of the present invention may be introduced into an unconsolidated zone of a subterranean formation to stabilize particulates within the zone. The consolidating agent emulsions may disperse any loose fines within a proppant pack in a fracture, move any fines away from the fracture (or near well bore), stabilize gravel particulates around a screen, stabilize a screen failure, and/or lock the fines in the formation.

In another remedial embodiment, the consolidating agent emulsions of the present invention may be introduced into a subterranean formation that is producing unconsolidated particulate material as a result of, inter alia, depletion, water breakthrough, etc. The consolidating agent emulsions may stabilize and/or strengthen the particulates in the formation and thereby reduce their undesirable production.

3. The Proactive Methods

The proactive methods of the present invention are most suited for wells that have not been fractured or gravel packed yet. These methods can be used as a pre-treatment before a fracturing treatment or at the early stage of a fracturing treatment (including diagnostic pumping) as a pre-pad treatment.

In some proactive embodiments of the present invention, the consolidating agent emulsions of the present invention may be introduced into an unconsolidated zone of a subterranean formation to stabilize particulates within the zone.

In some embodiments, the proactive methods of the present invention comprise placing the consolidating agent emulsions before or as part of a pre-pad of a fracturing treatment into a subterranean formation. In some embodiments, subsequent to placing the consolidating agent emulsion composition in the formation, the subterranean formation may be fractured. This fracturing step may include the introduction of a plurality of particulates into the formation. In some embodiments, at least a portion of the particulates may be coated with a consolidating agent. In some embodiments, the coated particulates may be introduced into the fluid at the end of the fracturing treatment. In some embodiments, at least a plurality of the particulates may be of a larger size, such that the fracture has a higher conductivity. For example, the size of at least a plurality of the particulates may have a weight mean particle size ("$D_{50}$") of about 20 times to about 50 times the $D_{50}$ of the formation particulates.

In some embodiments, the consolidating agent emulsions of the present invention may be used in a supported open hole well bore. In supported open hole well bores, a liner or screen, for example, may be utilized to provide mechanical support and/or to allow the bore hole to conform and/or comply to the liner in very weak formation layers. In addition, in some supported open hole well bores, zonal isolation packers may also be used. It may be desirable in certain embodiments to use the consolidating agent emulsions of the present invention in a supported open hole well bore. One potential advantage of utilizing the consolidating agent emulsions of the present invention in a supported open hole well bore is that the formation around the well bore may be stabilized, thus mitigating any fines movement or long term plugging, such that the placement of a gravel pack may no longer be necessary.

4. Introducing Coated Particulates

In some embodiments, the consolidating agent emulsions of the present invention may be coated on particulates to be used in a fracturing or gravel packing process like those described above. As stated above, the term "coated" implies no particular degree of coverage or mechanism by which the consolidating agent becomes incorporated with the particulates. The term includes, but is not limited to, simple coating, adhesion, impregnation, etc. The resultant coated particulates may be introduced as part of a fracturing or gravel packing process, at any point during one of the methods described above. Preferably, the coated particulates are introduced towards the end of a fracturing or gravel packing treatment so that the maximum economic benefit can be obtained.

In accordance with the methods and compositions of the present invention, all or part of the particulates may be coated (preferably on-the-fly) with a consolidating agent using the consolidating agent emulsions of the present invention and may then be suspended in a fracturing fluid or used as part of a gravel packing process. The consolidating agent emulsions are used to coat the consolidating agent on dry particulates while the particulates are conveyed in a conveying and/or mixing device. The amount of consolidating agent coated on the particulates is in the range of about 0.1% to about 20% by weight of the particulate, with about 1-5% being preferred.

The term "on-the-fly" is used herein to mean that a flowing stream is continuously introduced into another flowing stream so that the streams are combined and mixed while continuing to flow as a single stream. The coating of the dry particulates with the consolidating agent emulsions and any mixing of the consolidating agent coated particulates with a fracturing fluid or treatment fluid are all preferably accomplished on-the-fly. However, as is well understood by those skilled in the art, such mixing can also be accomplished by batch mixing or partial batch mixing.

A wide variety of particulate materials may be used in accordance with the present invention, including, but not limited to, sand, bauxite, ceramic materials, glass materials, resin precoated proppant (e.g., commercially available from Borden Chemicals and Santrol, for example, both from Houston, Tex.), polymer materials, TEFLON (tetrafluoroethylene) materials, nut shells, ground or crushed nut shells, seed shells, ground or crushed seed shells, fruit pit pieces, ground or crushed fruit pits, processed wood, composite particulates prepared from a binder with filler particulate including silica, alumina, fumed carbon, carbon black, graphite, mica, titanium dioxide, meta-silicate, calcium silicate, kaolin, talc, zirconia, boron, fly ash, hollow glass microspheres, solid glass, and mixtures thereof. The particulate material used may have a particle size in the range of about 2 to about 400 mesh, U.S. Sieve Series. Preferably, the particulate material is graded sand having a particle size in the range of about 10 to about 70 mesh, U.S. Sieve Series. Preferred sand particle size distribution ranges are one or more of 10-20 mesh, 20-40 mesh, 40-60 mesh or 50-70 mesh, depending on the particle size and distribution of the formation particulates to be screened out by the particulate materials. Other particulates that may be suitable for use in subterranean applications also may be useful.

In various embodiments, injecting and squeezing may be performed to force the consolidating agent emulsion into the subterranean formation. In various embodiments, placing the foamed slurry into the subterranean formation may include injecting the foamed slurry into one or more void spaces. Some exemplary void spaces include void spaces disposed about a perforation, void spaces disposed about a casing, void spaces disposed about a liner (e.g., perforated liner, slotted liner, or failed sand control screen), and other void spaces in the subterranean formation proximate the wellbore.

In some embodiments, a second consolidation fluid is placed into the subterranean formation. The second consolidation fluid may include any of the consolidating agent emulsions described herein. The second consolidation may be a foamed fluid, and may be placed either before or after the particulate pack has been created. In the embodiments where creation of the particulate pack precedes placing the second consolidation fluid, placement of the second consolidation fluid may occur by injection through the particulate pack. For example, the second consolidation fluid may include a water pack to separate the particulates from the consolidating agent emulsion and ensure the particulate pack is firmly in place.

In yet other embodiments, the particulate pack may be omitted, at least from the initial treatment, with a foamed consolidating agent emulsion placed into the subterranean formation, followed by a gravel pack. In these embodiments the gravel pack fluid itself may or may not be foamed. Moreover, the gravel pack fluid itself may or may not include a consolidating agent emulsion. In yet another embodiment, first a consolidating agent emulsion is placed, followed by a slurry comprising particulates, followed by a consolidating agent emulsion which may or may not be foamed.

Some embodiments of the present invention comprise providing an injection well and introducing a tackifying treatment fluid to the injection well, wherein the tackifying treatment fluid comprises a base fluid and a tackifying agent. Suitable tackifying agents include (1) aqueous tackifying agents, (2) non-aqueous tackifying agents, (3) gelable compositions, and (4) zeta potential altering systems.

5. Zeta Potential Altering Systems

Zeta potential as used herein is defined by the charge that develops at the interface in the boundary of hydrodynamic shear between solid surfaces as a product of the electrostatic repulsion and the attractive forces related to the Van der Waals' forces. That is, zeta potential is a function of the surface charge of the particle, any adsorbed layer at the interface, and the nature and composition of the surrounding suspension medium. Zeta potential can be affected by changes in pH, conductivity of the medium (salinity and kind of salt), and concentration of particular additives (polymer, non-ionic surfactants, etc.). Systems useful in the present invention are those that are able to alter the zeta potential of the surfaces and particulates being treated to have zeta potential values between −20 and 20 mV. A zeta potential between −20 and 20 mV corresponds to an effective charge low enough that the repulsion is lowered to a point where aggregation occurs.

The active ingredient of suitable zeta potential altering systems is an inner salt of a very low-molecular weight polymer, that when added to a treatment fluid disperses and rapidly coats any metal oxide substrate it encounters, such as proppant or subterranean formation. It also contains a penetrating alcohol, such as methanol, capable of disrupting the water layer that coats solid surfaces in the formation. The zeta potential altering system does not modify the chemical structure of friction reducers and gelling systems such as nonionic, cationic, and anionic polyacrylamide and guar gums and derivatives, making it compatible with slick-water systems and borate-based crosslinked gels. The active component is stable in acid and caustic solutions except under extreme conditions and is thermally stable to 450° F. Examples of suitable zeta-potential altering systems are described in U.S. Patent Publication No. 2009/0203553 and U.S. Pat. No. 7,350,579, the entire disclosures of which are hereby incorporated by reference.

To facilitate a better understanding of the present invention, the following examples of certain aspects of some embodiments are given. In no way should the following examples be read to limit, or define, the entire scope of the invention.

EXAMPLE 1

Diagenesis tests were performed using 3-in, diameter radial API conductivity cells fitted with Ohio sandstone core wafers on the top and bottom of the proppant pack. Alumina-based proppant at a loading of 2 lb/ft$^2$ was used for the proppant pack, with 2% KCl as the fluid medium. Sample proppant pack No. 1 contained untreated proppant and Sample proppant pack No. 2 contained proppant that was coated using the consolidating agent emulsions of the present invention.

Figure 2:
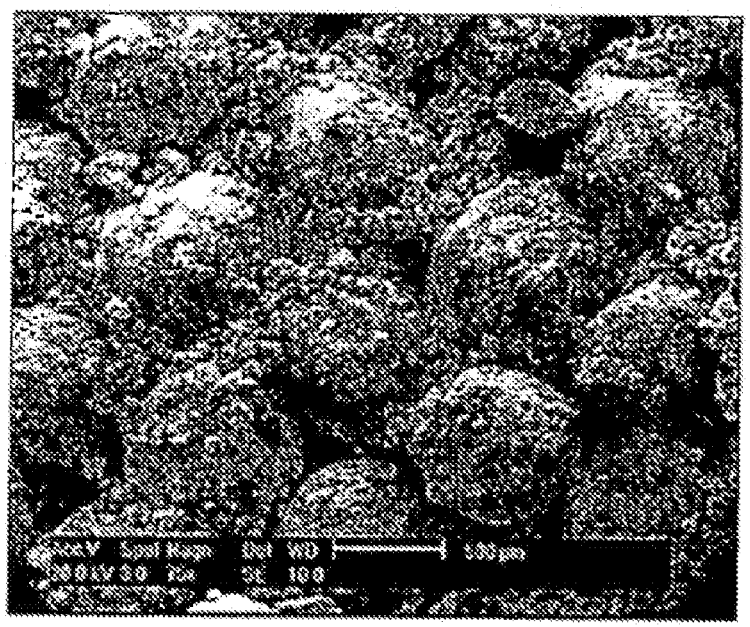
FIG. 2 is a micrograph image of untreated proppant particulates after being subjected to a stress load of 10,000 psi at 250° F.
Figure 3:
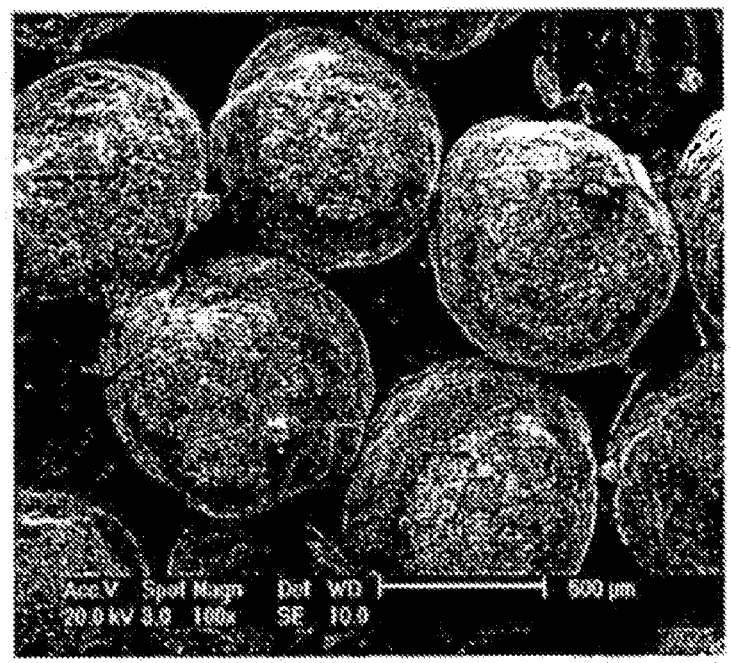
FIG. 3 is a micrograph image of proppant particulates that have been treated with a consolidating agent emulsion in accordance with an embodiment of the present invention after being subjected to a stress load of 10,000 psi at 250° F.

After preparation, each sample was subjected to a stress load of 10,000 psi at 250° F. for 126 hours in static conditions. The API conductivity cell was then disassembled, and the Ohio sandstone wafers were examined to determine proppant particulate embedment by optical microscopy. For each sample, the proppant layer next to the Ohio sandstone wafer and the center of the proppant pack were examined by Environmental Scanning Electron Microscope. FIG. 1 is a microscopy image of proppant particulates used in each sample before exposure to the stress load and temperatures. FIG. 2 is a microscopy image of Sample proppant pack No. 1, containing untreated proppant particulates, after being exposed to the stress load and temperatures. FIG. 3 is a microscopy image of Sample proppant pack No. 2, containing proppant particulates that were coated using the consolidating agent emulsions of the present invention, after being exposed to the stress load and temperatures.

Electron dispersive X-ray (EDX) was also used to determine the silica-to-aluminum ratio in various areas of Sample proppant pack No. 1. The silica-to-aluminum ratio observed for the proppant was 0.9, as is typical for ceramic proppant, while that for the Ohio sandstone was 8.4. The porosity filling precipitate was found to be 4.9, or an intermediate concentration of these metals. The silica-to-aluminum ratio was not measured in Sample proppant pack No. 2 because the porosity filling precipitate was not found in the pack.

Thus, by treating the proppant pack with the consolidating agent emulsions of the present invention, diagenesis appeared to be reduced and the porosity filling precipitate at least appeared to be substantially eliminated from the pack.

EXAMPLE 2

Conductivity tests were performed by preparing 5-lb/ft$^2$ proppant packs of 20/40-mesh ceramic proppant. Sample proppant pack No. 3 and Sample proppant pack No. 4 were each separately placed between two unconsolidated silica wafers, which were used to simulate unconsolidated formation faces of a soft formation. Each sample proppant pack and the two unconsolidated silica wafers were then placed between two Ohio sandstone core wafers and placed in a linear API conductivity cell.

The two cells were then brought to an initial stress of 2,000 psi and 180° F. Sample proppant pack No. 3 was then treated with only 3% KCl and Sample proppant pack No. 4 was treated with a consolidating agent emulsion of the present invention. Both treatments were performed by injecting the proppant pack with 3 pore volumes of the treatment fluid. Flow was then initiated through each Sample proppant pack in the conventional linear direction to determine the initial conductivity of each of the Sample proppant packs at 2,000 psi closure stress. After stable flow was achieved, flow at a rate of 2 mL/min was initiated through the wafers to simulate production from the formation into the fracture. The effluent fluid was then captured to examine for fines production.

Sample proppant pack No. 3 failed with the continuous flow from the silica wafers into the proppant pack. This failure resulted in the fines exiting the test cell, thereby causing the overall width to collapse. The collapse was caused by the flow removing the fines that make up the wafer and transporting them through the proppant pack and out of the cell. After the failure of the proppant pack, all flow was stopped for this test cell. Differential pressure for the conductivity measurement increased beyond the capacity of the sensor because of the fines invasion into the pack. Therefore, no subsequent values were obtained for Sample proppant pack No. 3.

Sample proppant pack No. 4 continued to allow inflow through the silica wafers without failure or collapse of the overall width. After reaching stable conductivity measurements at 2,000 psi closure, the stress load was increased to 4,000 psi closure. Again, after reaching stable conductivity measurements, the stress load was decreased back to 2,000 psi closure. This stress cycle was repeated several times with a doubling in inflow rate with each cycle to try to destabilize the pack.

Conductivity results for Sample proppant pack No. 3 and Sample proppant pack No. 4 are shown in Table 1 below.

TABLE 1

| Time (hr) | Closure Stress (psi) | Inflow Rate (cc/min) | Conductivity (mD-ft) for Sample proppant pack No. 3 | Conductivity (mD-ft) for Sample proppant pack No. 4 |
|---|---|---|---|---|
| 0 | 2000 | 2 | 13787 | 12435 |
| 20 | 2000 | 2 | 2 | 11089 |

TABLE 1-continued

| Time (hr) | Closure Stress (psi) | Inflow Rate (cc/min) | Conductivity (mD-ft) for Sample proppant pack No. 3 | Conductivity (mD-ft) for Sample proppant pack No. 4 |
|---|---|---|---|---|
| 43 | 2000 | 2 | — | 11362 |
| 67 | 2000 | 2 | — | 12283 |
| 95 | 4000 | 4 | — | 11708 |
| 139 | 4000 | 4 | — | 11540 |
| 164 | 2000 | 2 | — | 11822 |
| 187 | 2000 | 2 | — | 11905 |
| 235 | 2000 | 2 | — | 11504 |
| 307 | 4000 | 4 | — | 11166 |
| 332 | 2000 | 2 | — | 11756 |
| 355 | 2000 | 2 | — | 11327 |

Thus, Example 2 demonstrates, inter alia, that the consolidating agent emulsions of the present invention may effectively control or mitigate the invasion of formation fines into the proppant and may allow the proppant pack to maintain conductivity.

EXAMPLE 3

Figure 4:
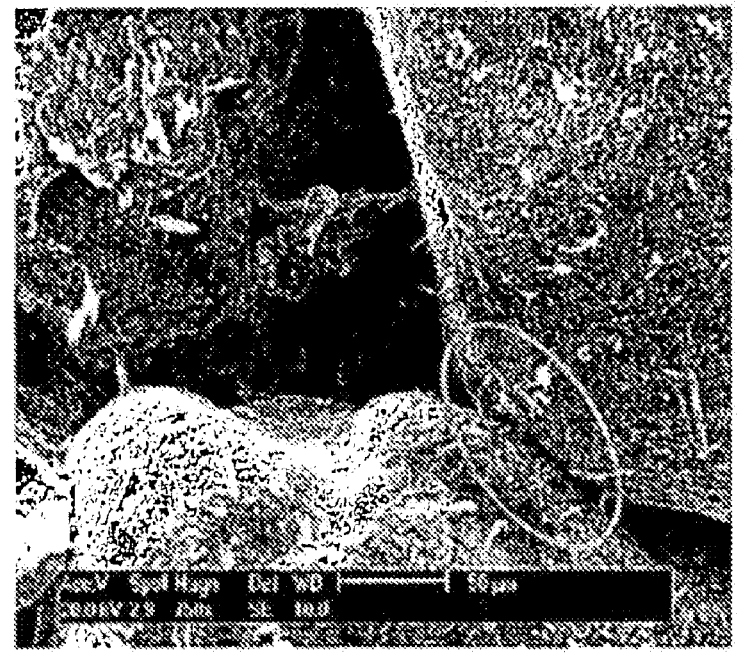
FIG. 4 is a micrograph image of a Salt Wash South Core that has been treated with a consolidating agent emulsion in accordance with an embodiment of the present invention.
Figure 5:
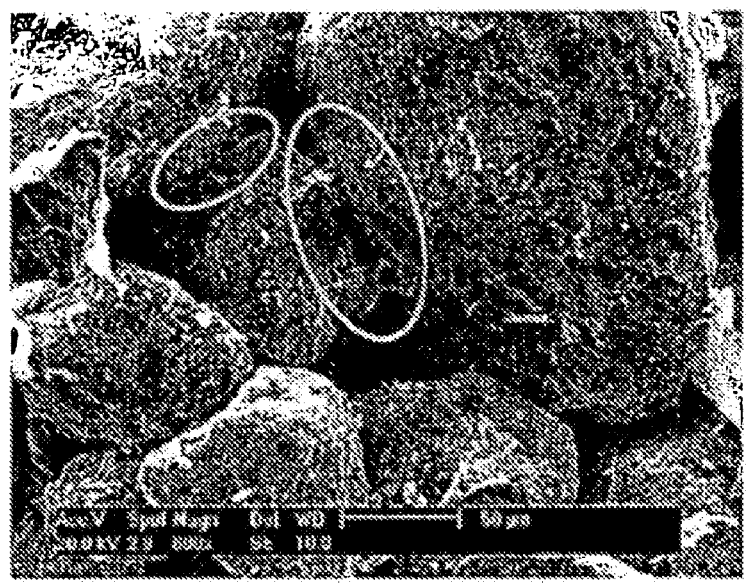
FIG. 5 is a micrograph image of a Salt Wash South Core that has been treated with a consolidating agent emulsion in accordance with an embodiment of the present invention.

Mechanical strength tests were performed using two Salt Wash South core samples having a 4-inch diameter with a ¼ inch perforation drilled into the end of each core. Sample Core No. 1 was untreated. Sample Core No. 2 was treated using consolidating agent emulsion "FDP-S863-07, " which is available from Halliburton Energy Services, Inc., of Duncan, Okla. The consolidating agent emulsion was then displaced with a postflush comprising nitrogen, and then the resin composition in the consolidating agent emulsion was allowed to cure. Both sample cores were installed inside a 4-inch diameter Hassler Sleeve Assembly. A confining pressure of 1,500 psi was then applied on the core. A brine prepared from 3% (wt/vol) KCl was injected into the cores for testing. For Sample Core No. 1, the injection rates were increased while recording the change in pressure and flow rate at which sand was produced. For Sample Core No. 2, the test cell limitations were reached without inducing sand production. Core plugs were then drilled out of the large cores and the unconfined compressive strength was measured. FIGS. 4 and 5 are microscopy images of Sample Core No. 2, demonstrating how the consolidating agent may be concentrated at contact points between particulates to provide enhanced compressive strength without significantly damaging reservoir permeability.

Compressive strength results for Sample Core No. 1 and Sample Core No. 2 are shown in Table 2 below.

TABLE 2

| | Sample Core No. 1 (untreated) | Sample Core No. 2 (treated) |
|---|---|---|
| Core Size | 4 inch diameter, 6 inch length | 4 inch diameter, 6 inch length |
| Perforation Diameter | ¼ inch | ¼ inch |
| Perforation Length | 4 inches | 4 inches |
| Confining Stress | 1500 psi | 1500 psi initially to 3000 psi at high flow conditions |
| Maximum Flow Conditions | 300 mL/min, 300 psi ΔP | 3000 mL/min, 2000 psi ΔP |
| Sand Produced | Yes | No |
| Unconfined Compressive Strength | 400 psi | 1332 psi |
| Cohesive Strength | 10 psi | 100 psi |

Thus, Example 3 demonstrates, inter alia, that the consolidating agent emulsions of the present invention may provide enhanced compressive and/or cohesive strength, and may also minimize the flow back of unconsolidated particulate material.

EXAMPLE 4

A synthetic sand mixture prepared from 90% (wt/wt) of 70/170-mesh sand and 10% of silica flour was first packed inside a rubber sleeve. The sand pack was then installed inside a stainless flow cell. An annular pressure of 1,000 psi was then applied on the sand pack. A brine prepared from 3% (wt/vol) KCl was used to saturate the sand pack at an injection rate of 2 mL/min by flowing from the bottom up direction of the flow cell for a total volume of 1,000 mL. After the sand pack was saturated, the injection flow rate was increased to 10 mL/min until a steady pressure drop was obtained to determine initial permeability for the sand pack.

For Sample Pack No. 1, the treatment sequence included a pre-flush of 3% KCl brine containing 0.5% of a cationic surfactant with an injection rate of 10 mL/min for a total volume of 1,000 mL, a treatment of 1.5% active water-based resin mixture with an injection rate of 10 mL/min for a total volume of 1,000 mL, and a post-flush volume of 3% KCl brine containing 0.5% of a cationic surfactant with an injection rate of 10 mL/min for a total volume of 1,000 mL. After the post-flush injection, all the values were shut off. Heat was applied to the flow cell by heat tape to bring the temperature to 180° F. and the treated sand pack was allowed to cure for 48 hours.

For Sample Pack No. 2, the treatment sequence included a pre-flush of 3% KCl brine containing 0.5% of a cationic surfactant with an injection rate of 10 mL/min for a total volume of 1,000 mL, a treatment of 3% active water-based resin mixture with an injection rate of 10 mL/min for a total volume of 1,000 mL, and a post-flush volume of 3% KCl brine containing 0.5% of a cationic surfactant with an injection rate of 10 mL/min for a total volume of 1,000 mL After the post-flush injection, all the values were shut off. Heat was applied to the flow cell by heat tape to bring the temperature to 180° F. and the treated sand pack was allowed to cure for 48 hours.

For Sample Pack No. 3, the treatment sequence included a pre-flush of 3% KCl brine containing 0.5% of a cationic surfactant with an injection rate of 10 mL/min for a total volume of 1,000 mL, a treatment of 3% active water-based resin mixture with an injection rate of 10 mL/min for a total volume of 1,000 mL, and a post-flush volume of 3% KCl brine containing 0.5% of a cationic surfactant with an injection rate of 10 mL/min for a total volume of 1,000 mL After the post-flush injection, all the values were shut off. Heat was applied to the flow cell by heat tape to bring the temperature to 180° F. and the treated sand pack was allowed to cure for 48 hours.

Figure 6:
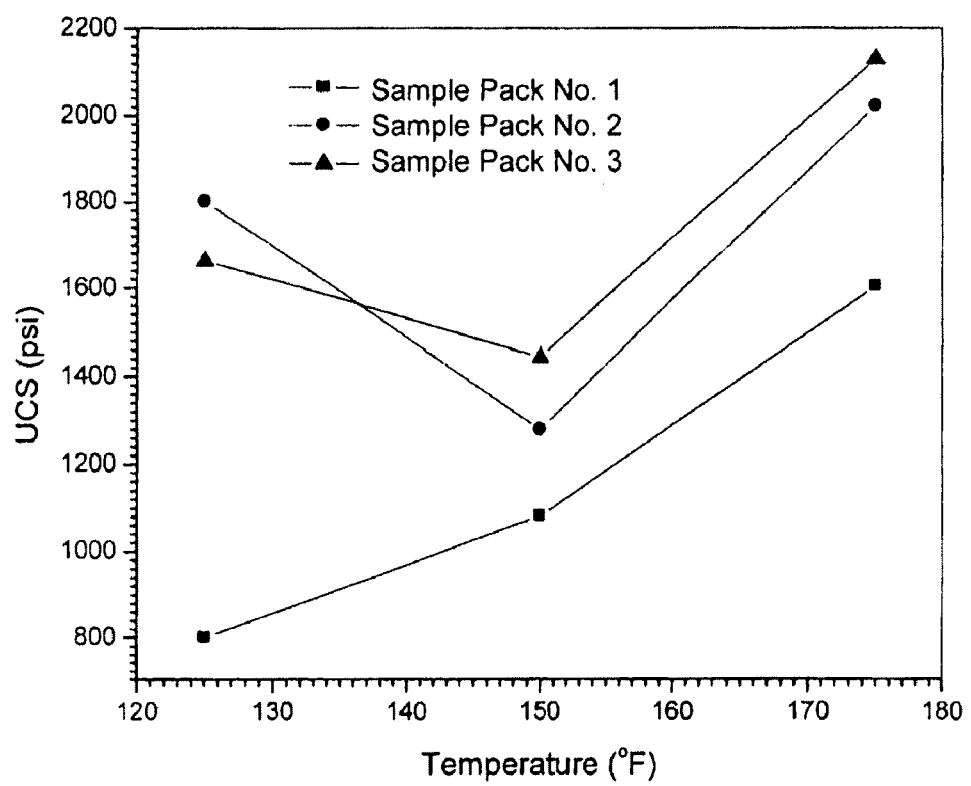
FIG. 6 illustrates the unconfined compressive strength of sample sand packs treated with a consolidating agent emulsion of the present invention.
Figure 7:
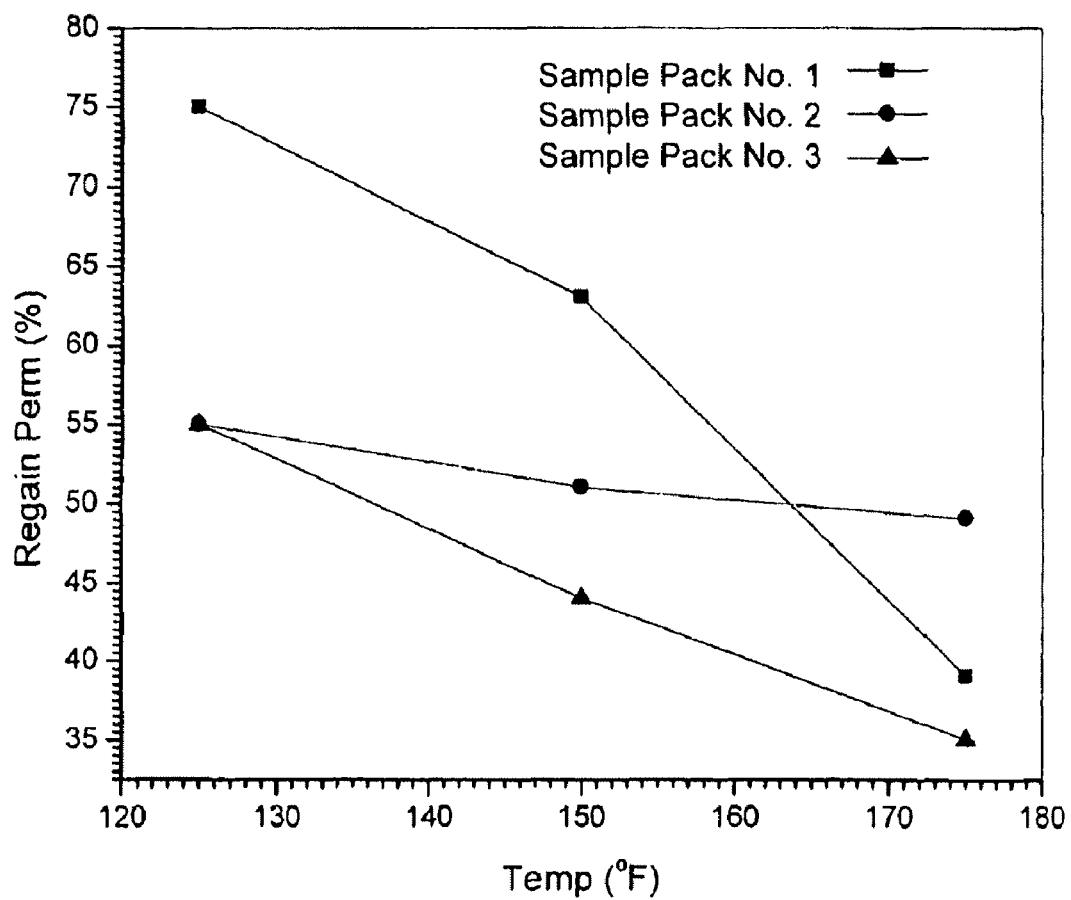
FIG. 7 illustrates the regained permeability of sample sand packs treated with a consolidating agent emulsion of the present invention.

After the curing period for each Sample Pack, the temperature was allowed to cool down to room temperature. Again, a brine of 3% KCl was injected from the bottom up direction through the treated sand pack to determine its regained permeability. After this brine injection, the rubber sleeve containing the sand pack was removed from the flow cell. An incision was made from the top to the bottom of the sleeve to allow for the removal of the consolidated sand pack. Cores were then obtained from each of the sample consolidated sand packs to determine mechanical properties of the consolidated sand. Compressive strength results and regained permeability results for each sample are shown in FIGS. 6 and 7, respectively.

Thus, Example 4 demonstrates, inter alia, that the consolidating agent emulsions of the present invention may provide enhanced compressive strength and/or cohesive strength, and satisfactory regained permeability.

EXAMPLE 5

Flow tests were conducted on a 7-inch diameter×24 inch long Castlegate core. In phase one, the core was saturated with a potassium chloride (KCl) brine and then taken to irreducible water saturation by flowing odorless mineral spirits (OMS). The core was then placed in a test assembly under simulated reservoir conditions of 6000 psi over burden pressure and 3000 psi pore pressure. The core was then perforated using 500 psi under balance to allow the perforation to surge and clean up slightly. The core was then removed and placed in a large flow cell where 3000 psi confining stress was applied. The core was then flowed at several flow rates using OMS and OMS+KCl. During this phase, significant quantities of formation sand were produced.

Figure 8:
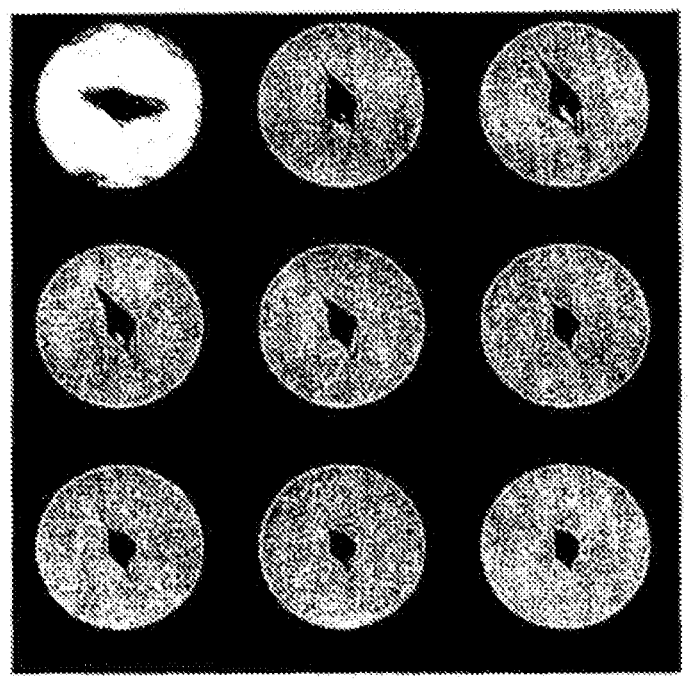
FIG. 8 is a CT scan image of a Castlegate Core sample that was subjected to pretreatment flow and subsequently treated with a consolidating agent emulsion in accordance with an embodiment of the present invention.

In phase two, the core was then heated to 170° F. and treated using I pore volume of a consolidating agent emulsion of the present invention, displaced with nitrogen, and allowed to cure over night. The core was once again flowed at several flow rates using OMS and OMS+KCl while maintaining 3000 psi confining stress. During this phase only very small quantities of sand production were observed. The core was removed and CT scanned to examine the perforation. FIG. 8 is a CT scan image from the core.

The Castlegate core had an unconfined compressive strength of 800 psi before treatment with a consolidating agent emulsion of the present invention and an unconfined compressive strength of 1500 psi after treatment with a consolidating agent emulsion. The permeability of the core was 500 to 1000 millidarcies and the porosity was 25% to 30%.

Flow tests results for phases 1 and 2 are shown in Table 3 below.

TABLE 3

| Phase One | Phase Two |
|---|---|
| Max Flow Rate 1.796 gallons per minute ("gpm") (OMS and OMS + KCl) | Max Flow Rate 1.969 gpm (OMS and OMS + KCl) |
| Max ΔP - 592 psi | Max ΔP - 723 psi |
| Total sand produced - 353 gr | Total sand produced - 16.4 gr |
| 0.7 gpm (OMS) - 70 gr sand | 0.45 gpm (OMS)- 2.6 gr sand |
| 0.75 gpm(OMS) - 22 gr sand | 0.8 gpm (OMS) - 3.9 gr sand |
| 0.9 gpm(OMS) - 61 gr sand | 1.25 gpm (OMS + KCl) 0.74 gr sand |
| 0.95 gpm (OMS + KCl) 160 gr sand | 1.65 gpm (OMS + KCl) 1.65 gr sand |
| 1.55 gpm (OMS + KCl) 40 gr sand | 1.97 gpm (OMS + KCl) 1.69 gr sand |

Thus, Example 5 demonstrates, inter alia, that the consolidating agent emulsions of the present invention may provide enhanced compressive and/or cohesive strength.

EXAMPLE 6

Figure 9:
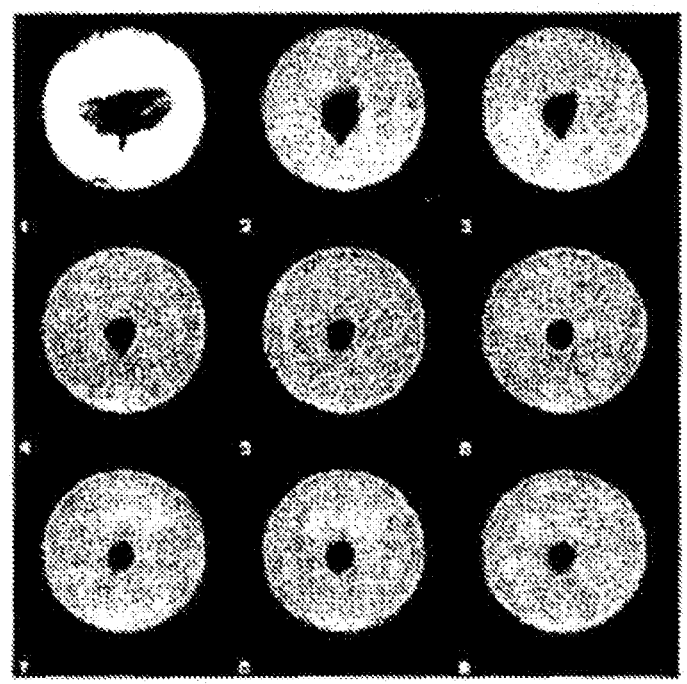
FIG. 9 is a CT scan image of a Castlegate Core sample that has been treated with a consolidating agent emulsion in accordance with an embodiment of the present invention.

Flow tests were conducted on a 7-inch diameter×24 inch long Castlegate core. The core was perforated using 504 psi under balance. The core was heated to 170° F. and treated using 2 pore volumes of a consolidating agent emulsion of the present invention, displaced with nitrogen, and allowed to cure over night. The core was flowed at a maximum rate of 1.788 gpm using OMS and OMS+a 3% KCl brine while maintaining 3000 psi confining stress. During this phase only very small quantities of sand production were observed. The core was removed and CT scanned to examine the perforation. FIG. 9 is a CT scan image from the core. Flow tests results are shown in Table 4 below.

TABLE 4

| Fluid | Delta Pressure (psi) | Flow Rate (gpm) | Sand Produced (gr) |
|---|---|---|---|
| OMS | 191 | 0.346 | 3.6 |
| OMS | 620 | 1.672 | 1.4 |
| OMS + KCl | 551 | 1.01 | 0 |
| OMS + KCl | 772 | 0.859 | 0 |

Thus, Example 6 demonstrates, inter alia, that the consolidating agent emulsions of the present invention may provide enhanced compressive and/or cohesive strength.

TEST 1

A brass cell was packed with a 90/10 sand mixture to obtain a 2-inch tall sand pack. The sand pack was saturated with 2 pore volumes (PVs) of 3% KCl brine. The sand pack was preflushed with 2 PVs of 3% KCl brine containing 0.5% ES-5™ Surfactant. 100 grams of 40/60 mesh sand were mixed with 100 cubic centimeters (cc) of FDP-S863 consolidating agent emulsion (available from Halliburton Energy Services, Inc., of Duncan, Okla.) and stirred well. The slurry was foamed with 0.5 cc of HC-2™ agent and the entire foamed slurry was poured into the brass cell to fill up the remaining void with 40/60 sand while simultaneously treating the 90/10 sand pack with FDP-S863. The brass cell was capped to make sure there was no leakage and the sand pack was cured at 200° F. for 20 hours.

Figure 10:
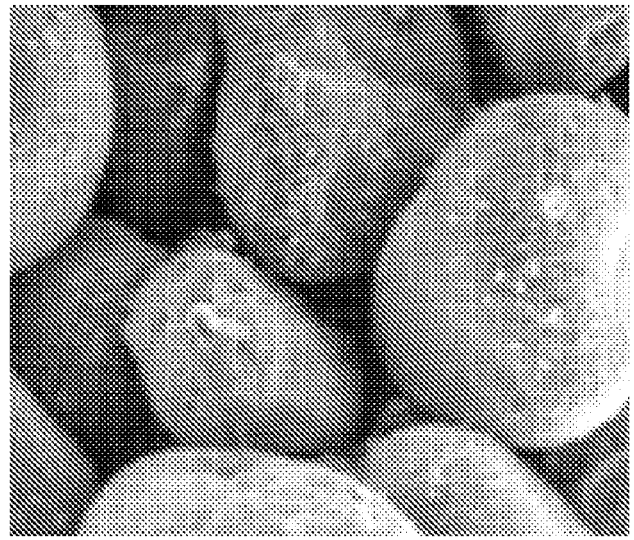
FIG. 10 is an image of a top of 40/60 sand in accordance with a first test.
Figure 11:
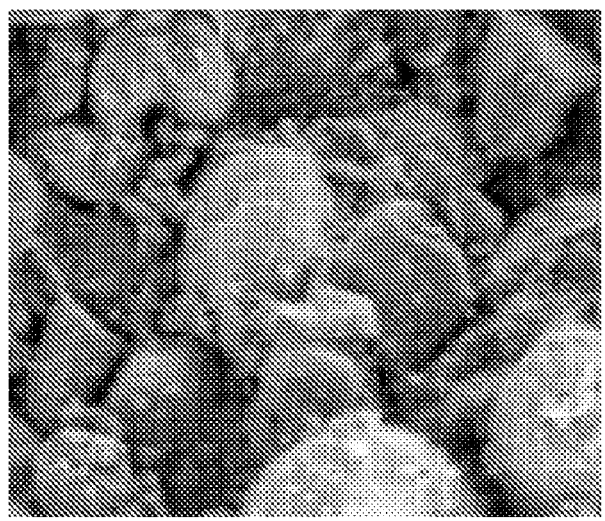
FIG. 11 is an image of a top of 90/10 sand in accordance with the first test.
Figure 12:
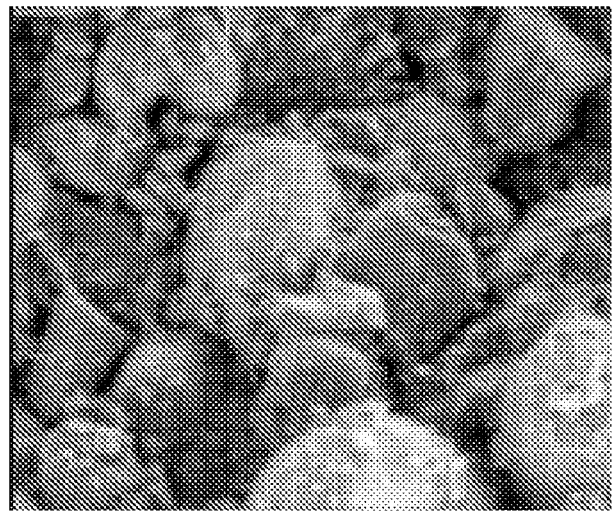
FIG. 12 is an image of a middle of 90/10 sand in accordance with the first test.

The results were that the tensile strength was 5 pounds per square inch (psi) at the top of the 40/60 sand (illustrated in FIG. 10), 10 psi at the middle of the 40/60 sand, 295 at the top of the 90/10 sand (illustrated in FIG. 11), and 2 psi at the middle of the 90/10 sand (illustrated in FIG. 12).

TEST 2

A brass cell was packed with a 90/10 sand mixture to obtain a 2-inch tall sand pack. The sand pack was saturated with 2 PVs of 3% KCl brine. The sand pack was preflushed with 2 PVs of 3% KCl brine containing 0.5% ES-5™ Surfactant. The sand pack was treated with 2 PVs of FDP-S863 consolidating agent emulsion. 100 grams of 40/60 mesh sand were mixed with 50 cc of FDP-S863 and stirred well. The entire liquid slurry was poured into the brass cell to fill up the remaining void with 40/60 sand. A postflush of 50 cc of diesel was added. The brass cell was capped to make sure there was no leakage and the sand pack was cured at 200° F. for 20 hours.

Figure 13:
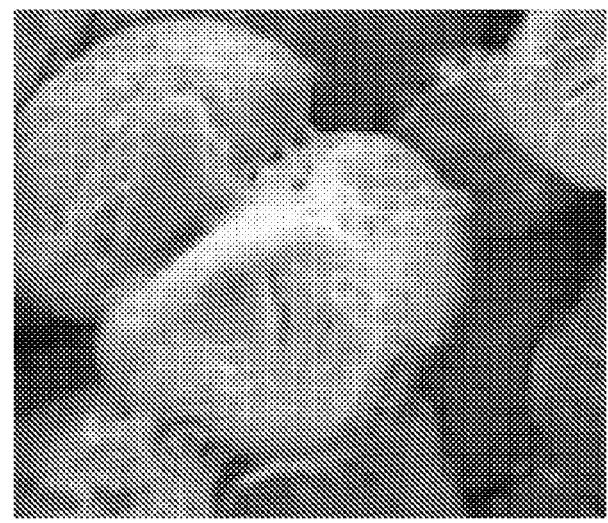
FIG. 13 is an image of 40/60 sand in accordance with a second test.
Figure 14:
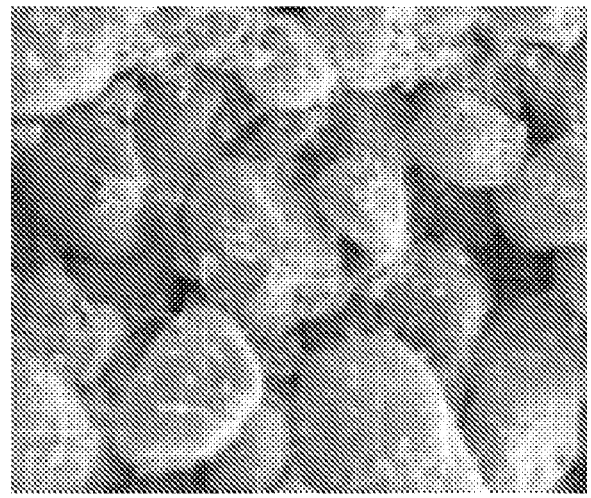
FIG. 14 is an image of 90/10 sand in accordance with the second test.

The results were that the unconfined compressive strength ("UCS") was 80 psi in the 40/60 mesh sand (illustrated in FIG. 13) and 70 psi in the 90/10 sand mixture (illustrated in FIG. 14).

TEST 3

A brass cell was packed with a 90/10 sand mixture to obtain a 2-inch tall sand pack. The sand pack was saturated with 2 PVs of 3% KCl brine. The sand pack was preflushed with 2 PVs of 3% KCl brine containing 0.5% ES-5™ Surfactant.

100 grams of 40/60 mesh sand were mixed with 50 cc of FDP-S863 and stirred well. The entire liquid slurry was poured into the brass cell to fill up the remaining void with 40/60 sand. The sand pack was treated with 2 PVs of FDP-S863. A postflush of 50 cc of diesel was added. The brass cell was capped to make sure there was no leakage and the sand pack was cured at 200° F. for 20 hours.

Figure 15:
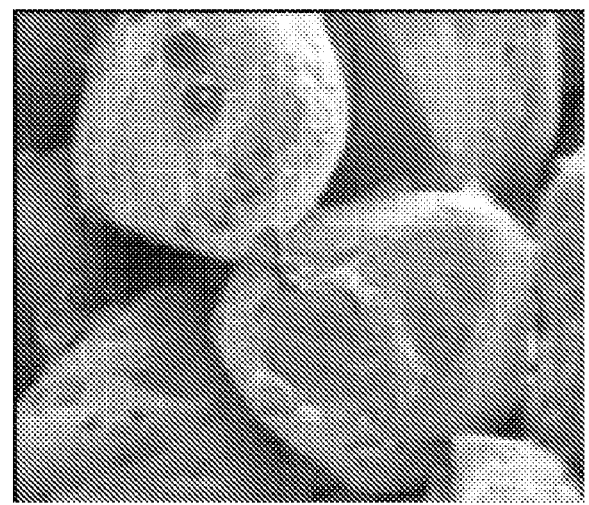
FIG. 15 is an image of 40/60 sand in accordance with a third test.
Figure 16:
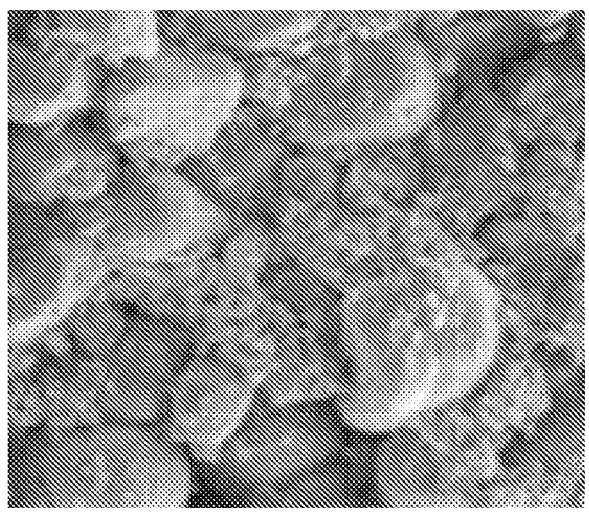
FIG. 16 is an image of 90/10 sand in accordance with the third test.

The results were that the UCS was 475 psi in the 40/60 mesh sand (illustrated in FIG. 15) and 130 psi in the 90/10 sand mixture (illustrated in FIG. 16).

Thus, the various embodiments of the present invention may provide completion methods that may stabilize the subterranean formation near the wellbore, including those portions of formations surrounding perforations, voids behind the casing, or the liner, such that formation sands or fines are prevented from being produced back during well production. A packed perforation may be supported with consolidated sand, with consolidation material having leaked off and strengthened the subterranean formation, while reducing or eliminating fines migration into the proppant pack. Such a strengthened subterranean formation may prevent failure, while stabilizing fines and preventing plugging of formation tunnels.

The use of foamed consolidating agent emulsions, foamed slurries, or other foamed fluids may allow for improved viscosity as compared with gels, while minimizing damage and providing suitable fluid loss control capabilities.

The methods of the present invention may be suitable for use in screenless completions. However, the methods may also be suitable when screens are in place. For example, consolidation fluids may be pumped with particulates to prevent fines migration.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "of about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention. Moreover, the indefinite articles "a" or "an," as used in the claims, are defined herein to mean one or more than one of the element that it introduces.

What is claimed is:

1. A method comprising:
   mixing particulates with a liquid consolidating agent emulsion to form a slurry having an aqueous external phase and a consolidating agent internal phase;
   creating a foamed slurry by adding a foaming agent and a gas to the slurry;
   placing the foamed slurry into a portion of a subterranean formation so as to create a particulate pack; and
   flushing the particulate pack with a postflush fluid.

2. The method of claim 1, comprising injecting and squeezing to force the consolidating agent emulsion into the subterranean formation.

3. The method of claim 1, wherein creating the particulate pack comprises:
   injecting the foamed slurry at a pump rate above a fracture gradient, creating fractures; and
   injecting the foamed slurry into the fractures.

4. The method of claim 1, wherein the consolidating agent emulsion comprises an aqueous fluid, an emulsifying agent, and a consolidating agent.

5. The method of claim 1, wherein the consolidating agent emulsion comprises an epoxy resin.

6. The method of claim 5, wherein the consolidating agent emulsion comprises a non-aqueous tackifying agent.

7. The method of claim 5, wherein the consolidating agent emulsion comprises a curing agent.

8. The method of claim 1, wherein the particulates comprise gravel; and wherein the particulate pack comprises a gravel pack.

9. The method of claim 1, wherein the particulates comprise proppant; and wherein the particulate pack comprises a proppant pack.

10. The method of claim 1, wherein the particulates are present in the slurry in an amount from about 0.5 pounds per gallon to about 24 pounds per gallon.

11. The method of claim 1, wherein the foamed slurry exhibits a foam quality in the range of about 10% to about 90%.

12. The method of claim 1, wherein postflushing the particulate pack comprises injecting an aqueous-based fluid into the particulate pack.

13. The method of claim 1, wherein postflushing the particulate pack comprises injecting a non-aqueous fluid into the particulate pack.

14. The method of claim 1, wherein placing the foamed slurry into the subterranean formation comprises injecting the foamed slurry into a plurality of void spaces.

15. The method of claim 14, wherein at least one of the void spaces is disposed about a perforation.

16. The method of claim 14, wherein at least one of the void spaces is disposed about a casing.

17. The method of claim 14, wherein at least one of the void spaces is disposed about a liner.

18. A method comprising:
   mixing particulates with a liquid consolidating agent emulsion to form a slurry having an aqueous external phase and a consolidating agent internal phase;
   creating a foamed slurry by adding a foaming agent and a gas to the slurry;
   placing the foamed slurry into a portion of a subterranean formation so as to create a particulate pack;
   flushing the particulate pack with a postflush fluid; and,
   placing a second consolidating fluid into substantially the same portion of the subterranean formation.

19. The method of claim 18, wherein placing the second consolidation fluid precedes the step of: placing the foamed slurry into a portion of a subterranean formation so as to create a particulate pack.

20. The method of claim 18, wherein the second consolidation fluid comprises a foamed fluid.

21. A method comprising:
   mixing particulates with a consolidating agent emulsion to form a slurry;

creating a foamed slurry by adding a foaming agent and a gas to the slurry;

placing the foamed slurry into a portion of a subterranean formation so as to create a particulate pack;

flushing the particulate pack with a postflush fluid; and, placing a second consolidating fluid into substantially the same portion of the subterranean formation;

wherein placing the second consolidation fluid follows the step of: flushing the particulate pack with a postflush fluid.

22. The method of claim 21, wherein placing the second consolidation fluid is followed by the step of: flushing the particulate pack with a second postflush fluid.

* * * * *